United States Patent
Duffield

(10) Patent No.: US 11,016,986 B2
(45) Date of Patent: May 25, 2021

(54) QUERY-BASED TIME-SERIES DATA DISPLAY AND PROCESSING SYSTEM

(71) Applicant: Palantir Technologies Inc., Palo Alto, CA (US)

(72) Inventor: Benjamin Duffield, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 278 days.

(21) Appl. No.: 15/997,177

(22) Filed: Jun. 4, 2018

(65) Prior Publication Data

US 2019/0171748 A1    Jun. 6, 2019

Related U.S. Application Data

(60) Provisional application No. 62/594,457, filed on Dec. 4, 2017.

(51) Int. Cl.
*G06F 7/00* (2006.01)
*G06F 16/248* (2019.01)
(Continued)

(52) U.S. Cl.
CPC ............ *G06F 16/248* (2019.01); *G06F 9/451* (2018.02); *G06F 16/245* (2019.01); *G06F 16/26* (2019.01); *G06F 40/18* (2020.01)

(58) Field of Classification Search
CPC ........ G06F 16/248; G06F 40/18; G06F 16/26; G06F 16/245; G06F 9/451; G06F 17/246; G06F 16/284; G06F 17/243
See application file for complete search history.

(56) References Cited

U.S. PATENT DOCUMENTS

| | | |
|---|---|---|
| 5,532,717 A | 7/1996 | Jones et al. |
| 5,724,575 A | 3/1998 | Hoover et al. |

(Continued)

FOREIGN PATENT DOCUMENTS

| | | |
|---|---|---|
| AU | 2014206155 | 12/2015 |
| EP | 0652513 | 5/1995 |

(Continued)

OTHER PUBLICATIONS

Anslow et al: "Web Software Visualization Via Google's Visualization API", Apr. 9, 2009 (Apr. 9, 2009), XP055564827, Retrieved from the Internet: URL:https://pdfs.semanticscholar.org/b6b4/bf47318a3e0e8649ff5824a2acc3ee49fc3b.pdf.

(Continued)

*Primary Examiner* — Mohammed R Uddin
(74) *Attorney, Agent, or Firm* — Knobbe Martens Olson & Bear LLP

(57) ABSTRACT

Various systems and methods are described herein for an improved spreadsheet application that allows a user to generate, manipulate, and replicate data visualizations (e.g., sparklines, graphs, charts, etc.) using functions without importing data into cells of the application. For example, data is stored in one or more remote or local data stores accessible to the improved spreadsheet application. A user enters a function into a cell of the improved spreadsheet application. The improved spreadsheet application generates a query using the function, the query identifying a portion of a dataset to retrieve from the data store(s). The improved spreadsheet application then transmits the query to the data store(s) and retrieves the requested data. A renderer of the improved spreadsheet application then renders a sparkline using the retrieved data. The improved spreadsheet application displays the rendered sparkline in the cell in which the function was entered, or at another designated location.

17 Claims, 10 Drawing Sheets

(51) Int. Cl.
*G06F 9/451* (2018.01)
*G06F 16/245* (2019.01)
*G06F 16/26* (2019.01)
*G06F 40/18* (2020.01)

(56) References Cited

U.S. PATENT DOCUMENTS

| | | |
|---|---|---|
| 5,872,973 A | 2/1999 | Mitchell et al. |
| 5,897,636 A | 4/1999 | Kaeser |
| 6,073,129 A | 6/2000 | Levine et al. |
| 6,094,653 A | 7/2000 | Li et al. |
| 6,161,098 A | 12/2000 | Wallman |
| 6,243,717 B1 | 6/2001 | Gordon et al. |
| 6,304,873 B1 | 10/2001 | Klein et al. |
| 6,366,933 B1 | 4/2002 | Ball et al. |
| 6,418,438 B1 | 7/2002 | Campbell |
| 6,510,504 B2 | 1/2003 | Satyanarayana |
| 6,549,752 B2 | 4/2003 | Tsukamoto |
| 6,560,620 B1 | 5/2003 | Ching |
| 6,574,635 B2 | 6/2003 | Stauber et al. |
| 6,609,085 B1 | 8/2003 | Uemura et al. |
| 6,745,382 B1 | 6/2004 | Zothner |
| 6,976,210 B1 | 12/2005 | Silva et al. |
| 6,980,984 B1 | 12/2005 | Huffman et al. |
| 7,058,648 B1 | 6/2006 | Lightfoot et al. |
| 7,111,231 B1 | 9/2006 | Huck et al. |
| 7,194,680 B1 | 3/2007 | Roy et al. |
| 7,233,843 B2 | 6/2007 | Budhraja et al. |
| 7,461,158 B2 | 12/2008 | Rider et al. |
| 7,667,582 B1 | 2/2010 | Waldorf |
| 7,725,530 B2 | 5/2010 | Sah et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,814,084 B2 | 10/2010 | Hallett et al. |
| 7,840,600 B1 | 11/2010 | Bhatia |
| 7,844,892 B2 | 11/2010 | Shewchenko et al. |
| 7,962,495 B2 | 6/2011 | Jain et al. |
| 7,984,374 B2 | 7/2011 | Caro et al. |
| 8,041,714 B2 | 10/2011 | Aymeloglu et al. |
| 8,060,259 B2 | 11/2011 | Budhraja et al. |
| 8,112,425 B2 | 2/2012 | Baum et al. |
| 8,126,848 B2 | 2/2012 | Wagner |
| 8,185,819 B2 | 5/2012 | Sah et al. |
| 8,401,710 B2 | 3/2013 | Budhraja et al. |
| 8,504,542 B2 | 8/2013 | Chang et al. |
| 8,676,857 B1 | 3/2014 | Adams et al. |
| 8,930,331 B2 | 1/2015 | McGrew et al. |
| 8,954,410 B2 | 2/2015 | Chang et al. |
| 9,009,827 B1 | 4/2015 | Albertson et al. |
| 9,043,696 B1 | 5/2015 | Meiklejohn et al. |
| 9,092,482 B2 | 7/2015 | Harris et al. |
| 9,116,975 B2 | 8/2015 | Shankar et al. |
| 9,195,700 B1 | 11/2015 | Becker |
| 9,208,159 B2 | 12/2015 | Stowe et al. |
| 9,230,280 B1 | 1/2016 | Maag et al. |
| 9,280,532 B2 | 3/2016 | Cicerone |
| 9,672,257 B2 | 6/2017 | Tobin et al. |
| 9,753,935 B1 | 9/2017 | Tobin et al. |
| 2001/0051949 A1 | 12/2001 | Carey et al. |
| 2001/0056522 A1 | 12/2001 | Satyanarayana |
| 2002/0091694 A1 | 7/2002 | Hrle et al. |
| 2002/0129054 A1* | 9/2002 | Ferguson ............... H04L 67/10 715/212 |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130993 A1 | 7/2003 | Mendelevitch et al. |
| 2003/0212718 A1 | 11/2003 | Tester |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0148301 A1 | 7/2004 | McKay et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0131990 A1 | 6/2005 | Jewell |
| 2005/0289524 A1 | 12/2005 | McGinnes |
| 2006/0074881 A1 | 4/2006 | Vembu et al. |
| 2006/0080316 A1 | 4/2006 | Gilmore et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0129554 A1 | 6/2006 | Suyama et al. |
| 2006/0161558 A1 | 7/2006 | Tamma et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0282429 A1 | 12/2006 | Hernandez-Sherrington et al. |
| 2006/0288035 A1 | 12/2006 | Viavant |
| 2007/0050429 A1 | 3/2007 | Goldring et al. |
| 2007/0061487 A1 | 3/2007 | Moore et al. |
| 2007/0143253 A1 | 6/2007 | Kostamaa et al. |
| 2007/0185850 A1 | 8/2007 | Walters et al. |
| 2007/0233756 A1 | 10/2007 | D'Souza et al. |
| 2007/0244672 A1* | 10/2007 | Kjaer .................. G06F 40/18 703/2 |
| 2007/0271317 A1 | 11/2007 | Carmel |
| 2008/0015970 A1 | 1/2008 | Brookfield et al. |
| 2008/0104060 A1 | 5/2008 | Abhyankar et al. |
| 2008/0104149 A1 | 5/2008 | Vishniac et al. |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0270316 A1 | 10/2008 | Guidotti et al. |
| 2008/0301378 A1 | 12/2008 | Carrie |
| 2009/0031247 A1 | 1/2009 | Walter et al. |
| 2009/0106308 A1 | 4/2009 | Killian et al. |
| 2009/0164387 A1 | 6/2009 | Armstrong et al. |
| 2009/0177962 A1 | 7/2009 | Gusmorino et al. |
| 2009/0254971 A1 | 10/2009 | Herz |
| 2009/0271435 A1 | 10/2009 | Yako et al. |
| 2009/0313223 A1 | 12/2009 | Rantanen |
| 2009/0313311 A1 | 12/2009 | Hoffmann et al. |
| 2010/0036831 A1 | 2/2010 | Vemuri et al. |
| 2010/0070489 A1 | 3/2010 | Aymeloglu et al. |
| 2010/0076939 A1 | 3/2010 | Iwaki et al. |
| 2010/0082541 A1 | 4/2010 | Kottomtharayil |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0191884 A1 | 7/2010 | Holenstein et al. |
| 2010/0211550 A1 | 8/2010 | Daniello et al. |
| 2010/0211618 A1 | 8/2010 | Anderson et al. |
| 2010/0235606 A1 | 9/2010 | Oreland et al. |
| 2010/0283787 A1 | 11/2010 | Hamedi et al. |
| 2010/0325581 A1 | 12/2010 | Finkelstein et al. |
| 2011/0029498 A1 | 2/2011 | Ferguson et al. |
| 2011/0047540 A1 | 2/2011 | Williams et al. |
| 2011/0153592 A1 | 6/2011 | DeMarcken |
| 2011/0173619 A1 | 7/2011 | Fish |
| 2011/0184813 A1 | 7/2011 | Barne et al. |
| 2011/0218978 A1 | 9/2011 | Hong et al. |
| 2011/0258158 A1 | 10/2011 | Resende et al. |
| 2011/0258242 A1 | 10/2011 | Eidson et al. |
| 2011/0270812 A1 | 11/2011 | Ruby |
| 2012/0072825 A1 | 3/2012 | Sherkin et al. |
| 2012/0110001 A1* | 5/2012 | Young ................. G06F 40/18 707/769 |
| 2012/0123989 A1 | 5/2012 | Yu et al. |
| 2012/0124179 A1 | 5/2012 | Cappio et al. |
| 2012/0150791 A1 | 6/2012 | Willson |
| 2012/0150925 A1 | 6/2012 | Gupta et al. |
| 2012/0159307 A1 | 6/2012 | Chung et al. |
| 2012/0221589 A1 | 8/2012 | Shahar et al. |
| 2012/0330908 A1 | 12/2012 | Stowe et al. |

(56) References Cited

U.S. PATENT DOCUMENTS

| | | |
|---|---|---|
| 2012/0330931 A1 | 12/2012 | Nakano et al. |
| 2013/0036346 A1 | 2/2013 | Cicerone |
| 2013/0060742 A1 | 3/2013 | Chang et al. |
| 2013/0066882 A1 | 3/2013 | Westbrooke |
| 2013/0097130 A1 | 4/2013 | Bingol et al. |
| 2013/0103657 A1 | 4/2013 | Ikawa et al. |
| 2013/0151388 A1 | 6/2013 | Falkenborg et al. |
| 2013/0304770 A1 | 11/2013 | Boero et al. |
| 2013/0318060 A1 | 11/2013 | Chang et al. |
| 2014/0040276 A1 | 2/2014 | Chen et al. |
| 2014/0095543 A1 | 4/2014 | Hsiao et al. |
| 2014/0101139 A1 | 4/2014 | Gemert et al. |
| 2014/0149272 A1 | 5/2014 | Hirani et al. |
| 2014/0181833 A1 | 6/2014 | Bird et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |
| 2015/0186338 A1 | 7/2015 | Mirra et al. |
| 2015/0186434 A1 | 7/2015 | Eichinger et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0278325 A1 | 10/2015 | Masuda et al. |
| 2015/0341467 A1 | 11/2015 | Lim et al. |
| 2015/0379065 A1 | 12/2015 | Yoshizawa et al. |
| 2016/0034545 A1 | 2/2016 | Shankar et al. |
| 2016/0062555 A1 | 3/2016 | Ward et al. |
| 2016/0088013 A1 | 3/2016 | Watson et al. |
| 2016/0164912 A1 | 6/2016 | Del Fante |
| 2016/0275432 A1 | 9/2016 | Guinness et al. |
| 2016/0328432 A1 | 11/2016 | Raghunathan |
| 2017/0068712 A1 | 3/2017 | Streufert et al. |
| 2017/0124741 A1* | 5/2017 | Campbell ............. G06F 40/106 |
| 2017/0270172 A1 | 9/2017 | Tobin et al. |
| 2017/0355036 A1 | 12/2017 | Rozmarynowski et al. |
| 2018/0039651 A1 | 2/2018 | Tobin et al. |
| 2018/0181629 A1 | 6/2018 | Stowe et al. |

FOREIGN PATENT DOCUMENTS

| | | |
|---|---|---|
| EP | 1126384 | 8/2001 |
| EP | 2555126 | 2/2013 |
| EP | 2863326 | 4/2015 |
| EP | 2891992 | 7/2015 |
| EP | 2993595 | 3/2016 |
| EP | 3101560 | 12/2016 |
| EP | 3279813 | 2/2018 |
| EP | 3343403 | 7/2018 |
| WO | WO 2008/043082 | 4/2008 |
| WO | WO 2012/025915 | 3/2012 |
| WO | WO 2014/019349 | 2/2014 |

OTHER PUBLICATIONS

Chi et al: "A spreadsheet approach to information visualization", UIST '97. 10th Annual Symposium on User Interface Software and Technology. Proceedings of the ACM Symposium on User Interface Software and Technology. Banff, Alberta, Canada, Oct. 14-17, 1997, Oct. 1, 1997, pp. 79-80, XP055564862, US.
Haak: "Dynamic configurable web visualization of complex data relations", Software Improvement Group, Jun. 1, 2016, pp. 1-61, XP055564860, Amsterdam Retrieved from the Internet: URL:https://homepages.cwi.nl/~paulk/thesesMasterSoftwareEngineering/2006/BartDenHaak. pdf.
Hochheiser et al: "Dynamic Query Tools for Time Series Data Sets: Timebox Widgets for Interactive Exploration", Information Visualization, vol. 3, No. 1, Mar. 1, 2004, pp. 1-18, XP055564826, ISSN: 1473-8716, DOI: 10.1057/palgrave.ivs.9500061.
Holz et al: "Relaxed Selection Techniques for Querying Time-Series Graphs", Oct. 7, 2009 (Oct. 7, 2009), XP055564834, British Columbia, Canada Retrieved from the Internet: URL:https://www.christianholz.net/2009-uist09-holzrelaxed_selection_techniques_for_querying_time-series_graphs.pdf.
Official Communication for European Patent Application No. 18210221.0 dated Mar. 19, 2019.
Anonymous, "BackTult—JD Edwards One World Version Control System", in 1 page, Jul. 23, 2007.
Antoshenkov, Gennady, "Dictionary-Based Order-Preserving String Compression", The VLDB Journal, pp. 26-39, 1997.
"The Apache Cassandra Project," http://cassandra.apache.org/ Printed Sep. 14, 2011 in 3 pages.
"Apache HBase," http://hbase.apache.org/ printed Sep. 14, 2011 in 1 page.
Baker et al., "Megastore: Providing Scalable, Highly Available Storage for Interactive Services", 5th Biennial Conference on Innovative Data Systems Research (CIDR '11), Asilomar, California, Jan. 9-12, 2011.
Bernstein et al., "Hyder—A Transactional Record Manager for Shared Flash", 5th Biennial Conference on Innovative Data Systems Research (CIDR '11), vol. 12, Asilomar, California, Jan. 9-12, 2011.
Chang et al., "Bigtable: A Distributed Storage System for Structured Data", Google, Inc., OSDI'06: Seventh Symposium on Operating System Design and Implementation, Seattle, WA, Nov. 2006.
Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.
Devanbu et al., "Authentic Third-party Data Publication", http://www.cs.ucdavis.edu/~devanbu/authbpub.pdf, p. 19, 2000.
Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.
Elmasri et al., "Fundamentals of Database Systems", Fourth Edition, pp. 455-491, 2004.
Hogue et al., "Thresher: Automating the Unwrapping of Semantic Content from the World Wide Web", 14th International Conference on World Wide Web, WWW 2005: Chiba, Japan, May 10-14, 2005.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontology Management System (Design)", Information Societies Technology Programme, pp. 1-27.
MacDonald et al., "Pro asp.net in C# 2010," Fourth Edition, Chapter 8, 2010.
Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.
Miklau et al., "Securing History: Privacy and Accountability in Database Systems", 3rd Biennial Conference on Innovative Data Systems Research (CIDR), pp. 387-396, Asilomar, California, Jan. 7-10, 2007.
Niepert et al., "A Dynamic Ontology for a Dynamic Reference Work", Joint Conference on Digital Libraries, pp. 1-10, Vancouver, British Columbia, Jun. 17-22, 2007.
Nierman, "Evaluating Structural Similarity in XML Documents", 6 pages, 2002.
Peng et al., "Large-scale Incremental Processing Using Distributed Transactions and Notifications", Proceedings of the 9th USENIX Symposium on Operating Systems Design and Implementation, USENIX, p. 14, 2010.
Quest, "Toad for Oracle 11.6—Guide to Using Toad", pp. 1-162, Sep. 24, 2012.
Steve Jones Ed—Association for Computing Machinery: "Graphical query specification and dynamic result previews for a digital library", UIST '98. 11th Annual Symposium on User Interface

(56) References Cited

OTHER PUBLICATIONS

Software and Technology. Proceedings of the ACM Symposium on User Interface Software and Technology San. Francisco, CA Nov. 1-4, 1998, pp. 143-151.

Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.

Wikipedia, "Federated Database System," Sep. 7, 2013, retrieved from the internet on Jan. 27, 2015 http://en.wikipedia.org/w/index.php?title=Federated_database_system&oldid=571954221.

Wollrath et al., "A Distributed Object Model for the Java System", Conference on Object-Oriented Technologies and Systems, pp. 219-231, Jun. 17-21, 1996.

Yang et al., "HTML Page Analysis Based on Visual Cues", A129, pp. 859-864, 2001.

Zhao et al., "Exploratory Analysis of Time-Series with ChronoLenses," IEEE Transactions on Visualization and Computer Graphics, vol. 17, No. 12, Oct. 23, 2011, pp. 2422-2431.

Official Communication for European Patent Application No. 18210221.0 dated Nov. 23, 2020, 14 pages.

Christopher Brown et al. "Advanced Data Analysis: From Excel PivotTables to Microsoft Access," The Importance of Being Earnest, Sep. 22, 2015, pp. 571-600.

Maxwell School of Syracuse University, "Excel 2010: Creating External References Topics came directly from Microsoft Excel 2010 Help Creating External References in Microsoft Excel 2010," retrieved from the Internet: https://www.maxwell.syr.edu/uploadedfiles/ict/training/handouts/handoutcreatingexternalreferencesinexcel2010.pdf, 2010, 16 pages.

\* cited by examiner

QUERY-BASED TIME-SERIES DATA DISPLAY AND PROCESSING SYSTEM

CROSS-REFERENCE TO RELATED APPLICATIONS

This application claims a priority benefit under 35 U.S.C. § 119 to U.S. Provisional Patent Application No. 62/594,457, filed on Dec. 4, 2017, and titled "QUERY-BASED TIME-SERIES DATA DISPLAY AND PROCESSING SYSTEM," the disclosure of which is hereby incorporated by reference herein in its entirety.

TECHNICAL FIELD

The present disclosure relates to systems and techniques for accessing one or more databases, and aggregating, analyzing, and/or displaying data in interactive user interfaces. More specifically, the present disclosure relates to systems and techniques for using a query-based approach for rendering and displaying data visualizations, such as graphs, charts, etc., or values in a computer-executed application.

BACKGROUND

Conventional spreadsheet applications are available that allow users to enter, visualize, and manipulate data in a tabular format. For example, a conventional spreadsheet application displays a set of cells in a user interface, where each cell corresponds to a row and a column. A user can enter a value in a cell and/or can enter a formula in a cell that produces a result dependent on values entered in other cells. If a user changes a value entered in one cell, a conventional spreadsheet can automatically update a value in another cell that depends on the changed value. Conventional spreadsheet applications further allow users to generate graphs based on values entered in cells.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for an improved times-series data analysis and viewing application that allows a user to generate, manipulate, and replicate data visualizations, such as sparklines, graphs, charts, etc., without importing data into cells of the application. One example of the time-series data analysis and viewing application is an improved spreadsheet application. For example, data (e.g., time-series data) may be stored in a data store accessible to the improved spreadsheet application. A user can enter a function that references a dataset (e.g., a time-series, such as a set of time-series data points), an operation to perform on the data in the set, an instruction that defines a dataset, etc. into a cell of the improved spreadsheet application. The improved spreadsheet application can generate a query using the function, where the query identifies a portion of a dataset to access or retrieve. The improved spreadsheet application can then transmit the query to the data store and access or retrieve the requested data. A renderer of the improved spreadsheet application can then render a data visualization, such as a sparkline, using the retrieved data. The improved spreadsheet application can display the rendered data visualization in the cell in which the function was entered, or at another designated location.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

One aspect of the disclosure provides a system comprising a renderer, at least one processor, and a storage device. The storage device is configured to store computer-executable instructions, the computer-executable instructions, when executed by the at least one processor, cause the system to at least: generate user interface data that, when rendered by a user device, causes the user device to display a user interface, where the user interface depicts a first data cell; receive an indication that a first function is entered in the first data cell; generate a first query using the first function; retrieve a plurality of data using the first query; render a data visualization using the plurality of data; and update the user interface data such that the user interface displays the rendered data visualization in the first data cell, while storing the first query as a value of the first data cell.

The system of the preceding paragraph can include any sub-combination of the following features: where the computer-executable instructions are associated with a first application, where the storage device is further configured with second computer-executable instructions associated with a second application, the second computer-executable instructions, when executed by the at least one processor, cause the system to at least: obtain the first query from the first application, render a second data visualization using the first query, and generate second user interface data that, when rendered by the user device, causes the user device to display a second user interface, where the second user interface includes the rendered second data visualization; where the computer-executable instructions, when executed by the at least one processor, further cause the system to at least: obtain an indication from the second application that the rendered second data visualization is modified, generate a modified version of the first query using the first function and the obtained indication, retrieve a modified plurality of data using the modified version of the first query, rendered a modified data visualization using the modified plurality of data, and update the user interface data such that the user interface displays the rendered modified data visualization in the first data cell; where the computer-executable instructions, when executed by the at least one processor, further cause the system to at least: receive an indication that a second function is entered in a second data cell, where the second function references the first function, generate a second query using the first function and the second function, retrieve a second plurality of data using the second query, render a second data visualization using the second plurality of data, and update the user interface data such that the user interface displays the rendered second data visualization in the second data cell; where the second function references a conditional formatting display operation, and where the computer-executable instructions, when executed by the at least one processor, further cause the system to at least render the second data visualization according to the conditional formatting display operation in response to a determination that a condition associated with the conditional formatting display operation occurred; where the computer-executable instructions, when executed by the at least one processor, further cause the system to at least: receive an indication that a third function is entered in a third data cell, where the third function references the first function, the second function, and a first condition, generate a third query using the first function, the second function, and the third function, retrieve a first value using the third query, and generate a notification in response to a determination that the first value satisfies the first condition; where the computer-executable instructions, when executed by the at least one processor, further cause the system to at least: cache the rendered data visualization, and retrieve the rendered data visualization from cache in response to reception of a re-paint operation; where a first timestamp is stored in a second data cell, where the first function references the second data cell, and where the computer-executable instructions, when executed by the at least one processor, further cause the system to at least: generate the query using the first function and the first timestamp, receive an indication that the second data cell is updated to store a second timestamp, generate a second query using the first function and the second timestamp, retrieve a second plurality of data using the second query, render a second data visualization using the second plurality of data, and update the user interface data such that the user interface displays the rendered second data visualization in the first data cell, while storing the second query as the value of the first data cell; where the first query identifies a number of available cell pixels, and where the plurality of data comprises, for each available cell pixel, a minimum value and a maximum value, and where the computer-executable instructions, when executed by the at least one processor, further cause the system to at least render the data visualization by, for each available cell pixel, drawing a line from the respective minimum value to the respective maximum value; where the computer-executable instructions, when executed by the at least one processor, further cause the system to at least: receive an indication that the first function is pulled to a second data cell, where the first function includes a parameter dependent on the location in which the first function is entered, and enter a second function in the second data cell, where the second function comprises the first function with the parameter modified to reflect the location in which the second function is entered; where the computer-executable instructions, when executed by the at least one processor, further cause the system to at least: receive an indication that the first data cell is resized, generate a modified query using the first function and a representation of a size of the resized first data cell, retrieve a second plurality of data using the modified query, render a second data visualization using the second plurality of data, and update the user interface data such that the user interface displays the rendered second data visualization in the first data cell; where the representation of the size of the resized first data cell comprises at least one of a number of available cell pixels in the resized first data cell or a time duration of a single pixel in the resized first data cell; where the computer-executable instructions, when executed by the at least one processor, further cause the system to at least: receive an indication that the first data cell is selected, update the user interface data such that the user interface displays a window of a first size, generate a modified query using the first function and a representation of a size of the window, retrieve a second plurality of data using the modified query, render a second data visualization using the second plurality of data, and update the user interface data such that the user interface displays the rendered second data visualization in the window; where the first function comprises a display operation, and where the computer-executable instructions, when executed by the at least one processor, further cause the system to at least render the data visualization using the plurality of data and the display operation; and where the rendered data visualization comprises one of a line graph, a bar graph, a pie graph, a sparkline, an X-Y scatterplot, or a chart.

Another aspect of the disclosure provides a computer-implemented method comprising: generating user interface data that, when rendered by a computing device, causes the computing device to display a user interface, where the user interface depicts a first data cell; receiving an indication that a first function is entered in the first data cell; generating a first query using the first function; retrieving a portion of a dataset using the first query; rendering a data visualization using the retrieved portion of the dataset; and updating the user interface data such that the user interface displays the rendered data visualization in the first data cell, while storing the first query as a value of the first data cell, where the method is performed using one or more processors.

Another aspect of the disclosure provides one or more non-transitory, computer-readable storage media storing computer-executable instructions, which if performed by one or more processors, cause the one or more processors to at least: generate user interface data that, when executed, causes a display of a user interface, where the user interface depicts a first data cell; receive an indication that a first function is entered in the first data cell; generate a first query using the first function; retrieve a portion of a dataset using the first query; render a data visualization using the retrieved portion of the dataset; and update the user interface data such that the user interface displays the rendered data visualization in the first data cell, where the query is stored in the first data cell.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Overview

Figure 1:
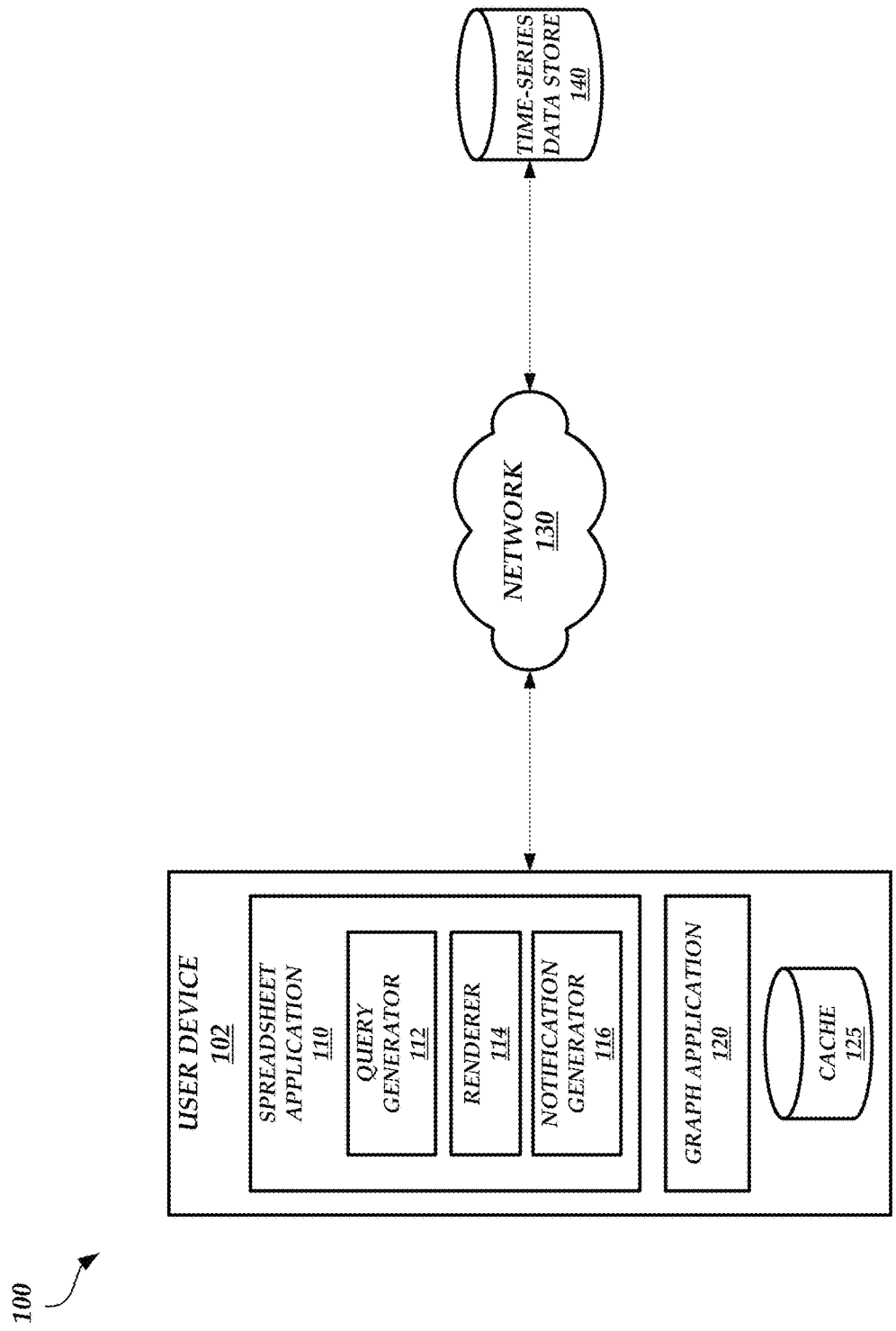
FIG. 1 illustrates a block diagram showing an example of various components of an operating environment in which a spreadsheet application executing on a user device generates and displays graphs in cells, in accordance with some embodiments.

As described above, a conventional spreadsheet application allows a user to generate data visualizations (e.g., line graphs, bar graphs, pie graphs, sparklines, X-Y scatterplots, etc.) based on values entered in cells. For example, a sparkline may be a chart displayed in a single cell that provides a visual representation of data. In particular, a conventional spreadsheet application includes cells in which data can be entered. A user can highlight one or more cells, and select an option to generate a sparkline, and the conventional spreadsheet application can generate the sparkline using the data entered in the highlighted cells.

However, because sparklines are graphical representations of data from other cells, conventional spreadsheet applications provide no mechanism for allowing users to modify an existing sparkline without manipulating the data in the cells used to generate the sparkline, to apply a function to a sparkline to generate a value, a set of values, or another data visualization (e.g., a sparkline), or to replicate the visual and/or data attributes of a first sparkline stored in one cell to other cells such that the other cells display sparklines with the same visual and/or data attributes as the first sparkline while being generated based on different datasets than the first sparkline. As an illustrative example, in some cases new data may be generated in real-time. A user may wish to periodically re-generate a sparkline, plotting only the most recent data. Conventional spreadsheet applications, though, provide no mechanism for automatically retrieving new data, automatically adjusting the range of cells that are accessed to generate the sparkline, and periodically re-generating the sparkline using data in the adjusted range of cells.

In addition, because data must be entered into cells of the spreadsheet before sparklines may be generated in that spreadsheet, conventional spreadsheet applications suffer from the inefficient usage of computing resources. For example, a user may wish to generate a sparkline based on a large set of data stored in an external file or external database. Importing the large set of data from the external file (or external database) into the conventional spreadsheet application may require the allocation of additional processing resources, thereby reducing the amount of CPU or other processing resources available to other applications executing on the computing device that executes the conventional spreadsheet application. Furthermore, importing this large set of data may result in a large spreadsheet file, thereby reducing the amount of memory available to other files and resources. This CPU and/or memory usage may be inefficient because while the entire dataset may be imported, the user may ultimately decide to only use a subset of the imported data in generating a sparkline. Conventional spreadsheet applications provide no ability for a user to restrict what data is imported. In fact, even if a user was able to manually remove unwanted data from the external file (or external database) prior to importation, the imported data can still unduly increase the conventional spreadsheet application file size. In embodiments in which a user views, created, and/or modifies spreadsheet application files via a browser application running on a user device, the amount of data transferred from a server to the user device may be unduly increased even if a user was able to manually remove unwanted data from the external file (or external database) prior to importation.

Accordingly, an improved times-series data analysis and viewing application described herein allows a user to generate, manipulate, and replicate data visualizations, such as sparklines, graphs, charts, etc., without importing data into cells of the application. One example of the time-series data analysis and viewing application is an improved spreadsheet application. For example, data (e.g., time-series data) may be stored in a data store accessible to the improved spreadsheet application. A user can enter a function that references a dataset (e.g., a time-series, such as a set of time-series data points), an operation to perform on the data in the set, an instruction that defines a dataset, etc. into a cell of the improved spreadsheet application. The improved spreadsheet application can generate a query using the function, where the query identifies a portion of a dataset to access or retrieve. The improved spreadsheet application can then transmit the query to the data store and access or retrieve the requested data. A renderer of the improved spreadsheet application can then render a data visualization, such as a sparkline, using the retrieved data. The improved spreadsheet application can display the rendered data visualization in the cell in which the function was entered, or at another designated location.

However, the value of the cell is not the rendered sparkline (e.g., a graphical file) or the data values used to render the sparkline. Rather, the value of the cell is a query that describes the data values that are rendered, which is referred to herein as a "data description" or "time-series description." In fact, the retrieved data is not required to be stored in any cell of the spreadsheet file. If the spreadsheet file is re-opened or transferred to another computing device, the sparkline can simply be re-rendered using the data description stored in the cell or a cached version of the rendered sparkline can be retrieved using the data description stored in the cell. Because the retrieved data is not actually stored in the spreadsheet file created by the improved spreadsheet application, the size of this spreadsheet file is reduced when compared to the size of spreadsheet files created by conventional spreadsheet applications (and/or the amount of data transferred from a server to a browser running on a user device is reduced when compared to the amount of data transferred to the browser by conventional network-based spreadsheet applications). The difference in file sizes can be significant in situations in which the user is attempting to generate a sparkline for a large dataset.

By setting the value of the cell to the data description rather than to the sparkline or the underlying data used to render the sparkline, the improved spreadsheet application further allows a user to modify the sparkline, identify characteristics of the sparkline, and/or replicate the attributes of the sparkline to other cells by simply referencing the data description in another cell. For example, a first data description stored in a first cell may cause the improved spreadsheet application to generate a query to retrieve data and to generate a first sparkline using the retrieved data for display in the first cell. The user can then enter a function in a second cell, where the function references the first data description and includes a parameter defining a modification to the first sparkline. The improved spreadsheet application can generate a modified query using the first data description and the function, and the renderer of the improved spreadsheet application can use the data retrieved using the modified query to generate a second sparkline that visually represents a modification to the first sparkline. The improved spreadsheet application can then display the second sparkline in the second cell, where the value of the second cell is a second data description describing the data values used to generate the second sparkline (but not the actual data values themselves).

While the present disclosure describes the improved spreadsheet application in the context of generating sparklines, this is not meant to be limiting. The improved spreadsheet application described herein can use similar techniques to generate other types of data visualizations in addition to sparklines for display in a spreadsheet or graphing application, for example, such as bar graphs, line graphs, pie graphs, scatterplots, etc.

Example Improved Spreadsheet Application Environment

FIG. 1 illustrates a block diagram showing an example of various components of an operating environment 100 in which a spreadsheet application 110 executing on a user device 102 generates and displays graphs in cells, in accordance with some embodiments. As illustrated in FIG. 1, the operating environment 100 includes the user device 102 and a time-series data store 140 that communicate with each other via a network 130.

The user device 102 is a physical computing device that is configured to execute the spreadsheet application 110, a graph application 120, and/or other applications (not shown). The user device 102 further includes hardware components, such as a processor, a networking interface, memory, and a cache 125.

The spreadsheet application 110 is configured to display one or more cells in a user interface. A user can enter data into a cell, such as text, a value, a data description, etc., that causes the spreadsheet application 110 to perform one or more actions and/or to display corresponding information. The spreadsheet application 110 can include various components to perform the operations described herein. For example, the spreadsheet application 110 includes a query generator 112, a renderer 114, and a notification generator 116.

As described herein, and as illustrated in FIGS. 4A-4C and 5A-5B described below, the spreadsheet application 110 displays one or more cells in a user interface. A user can enter a function in a cell, which is obtained by the query generator 112. The spreadsheet application 110 can accept various functions that receive arguments or parameters of one or more data types and produce results of one or more data types. For example, a data description can be a specific data type recognized by the spreadsheet application 110, with integers, strings, etc. being other data types recognized by the spreadsheet application 110. These different data types (e.g., data descriptions, integers, strings, etc.) are the "values" stored in a cell. A function can receive a string data type as a parameter and return a data description data type (e.g., a LOOKUP_TS function), receive a data description data type as a parameter and return a data description data type (e.g., a derivative function), receive a data description data type and one or more string data types as parameters and return a data description data type (e.g., a ROLLING function), receive a data description data type as a parameter and return an integer value data type (e.g., a LAST_VALUE function), and/or other such combinations of data type inputs and data type outputs. In particular, a function can retrieve or lookup a portion of a dataset for display as a sparkline, display a modified version of a sparkline displayed in another cell, compute a value corresponding to a portion of a dataset, etc. A function may be written in the following format: FUNCTION(<PARAM1>, <PARAM2>, <PARAM3>, . . . ).

A parameter can reference a dataset (e.g., by a storage location of the dataset, by the name of the dataset, etc.), another cell in the spreadsheet application 110 (e.g., by the row and column of the other cell with no indication that the value of the row and/or column cannot change (e.g., "A1," "B4," etc.), by the row and column of the cell with in indication that the value of the row and/or column cannot change if the data description is copied to another cell (e.g., using a dollar sign or other symbol, such as "$C3," "$D$7," "E$12," etc.), etc.), a mathematical operation (e.g., mean, median, max, min, mode, sum, standard deviation, variance, count, etc.), a display operation (e.g., format a sparkline with a specific color, line thickness, appearance, etc., conditional formatting (e.g., render a sparkline with a specific format if a certain condition occurs), etc.), a time instant (e.g., an absolute time (e.g., in the HH:MM:SS format), an integer corresponding to a relative time instant (e.g., time "0," time "10," time "50," etc.), etc.), a time window (e.g., a second, a minute, an hour, a day, a week, a month, a year, etc.), other values that can limit the amount of data to render as a sparkline or to evaluate (e.g., an indication to retrieve even data points, odd data points, data greater than a threshold value, data less than a threshold value, etc.), a notification operation (e.g., generate a notification if a condition occurs), and/or the like.

A function entered in one cell can include a parameter that references another cell for various reasons. For example, a first cell may display a sparkline or a value. A function entered in a second cell can include a parameter referencing the first cell to cause the spreadsheet application 110 to apply a mathematical and/or display operation to the sparkline or value displayed in the first cell (and represented by a corresponding data description stored in the first cell if a sparkline is displayed in the first cell) and to display the result in the second cell. As another example, a first cell may include text defining an operation (e.g., mean, median, max, etc.). A function entered in a second cell can include a parameter referencing the first cell to cause the spreadsheet application 110 to apply the operation defined in the first cell to data referenced by the function and to display the result in the second cell. As another example, a first cell may include a time instant or a time window. A function entered in a second cell can include a parameter referencing the first cell to cause the spreadsheet application 110 to apply an operation referenced by the function to a portion of data referenced by the function that falls within the time instant or time window.

The query generator 112 can process an obtained function to generate a query used to retrieve data corresponding to the function from the time-series data store 140. For example, the query generator 112 can process a function to identify a dataset referenced in the function (e.g., the dataset can be referenced directly, such as by name or storage location, or indirectly, such as via reference to another cell that stores a data description referencing a dataset). The query generator 112 can include an identification of the dataset in a query.

The query generator 112 can also process the function to identify any parameters that may limit the amount of data in the set to retrieve. For example, the function can include a time instant or time window that indicates that a sparkline or value is to be generated based on data that is associated with the time instant or that falls within the time window. The query generator 112 can use such parameter(s) to include in the query an identification of a specific portion of the dataset to retrieve (e.g., a time instant, a time frame, even data points, data greater than a threshold value, etc.).

The query generator 112 can also process the function to identify any mathematical operations to perform on the retrieved data. For example, the function can include a parameter indicating that an X time period rolling average should be calculated (e.g., where the X time period corresponds to an hour, a day, a week, etc.), that a statistical value (e.g., a maximum value, a minimum value, a mean, etc.) should be calculated, that the values of one dataset should be combined with the values of another dataset, and/or the like. The query generator 112 can include the mathematical operation and/or any metadata identifying how the mathematical operation should be applied (e.g., the time period over which a rolling average should be calculated, a portion of data on which to calculate a statistical value, etc.) in the query.

The query generator 112 can also determine the number of pixels available in the horizontal and/or vertical direction to display data in the cell in which the function is entered. For example, the amount of data included in the dataset and/or the amount of data included in an identified portion of the dataset (e.g., as identified by the time instant and/or time window parameter(s)) may exceed the amount of data that can be displayed in a cell given the pixel size of the cell. To reduce data retrieval latency, to reduce memory usage of the user device 102, and/or to reduce the processing requirements of the renderer 114 to render information, the spreadsheet application 110 may not attempt to retrieve all of the data referenced by the function given that not all of the data can be rendered and displayed due to the size and pixel constraints of the subject cell. Thus, the query generator 112 can include in the query a number of available cell pixels in the horizontal (and/or vertical) direction. Alternatively or in addition, the query generator 112 can calculate a time duration that applies to each available cell pixel in the horizontal (and/or vertical direction). For example, the query generator 112 can use time instant parameter(s) and/or a time window parameter to determine a total time duration for the data to be retrieved, and divide the total time duration by the number of available cell pixels in the horizontal (and/or vertical direction) to calculate the time duration of a single pixel. The query generator 112 can then include the time duration of a single pixel in the query (in place of or in addition to the number of available cell pixels in the horizontal (and/or vertical) direction).

Accordingly, the query generated by the query generator 112 can include an identification of a dataset (e.g., an identification of a specific set of time-series data), an identification of a portion of the dataset to retrieve, one or more mathematical operations and/or any metadata identifying how the mathematical operation(s) should be applied, a number of available cell pixels in the horizontal (and/or vertical) direction, and/or a time duration of a single pixel. For example, the query can be a set of data in the following format: (<DATASET_NAME>, <T1>, <T2>, <MATH_OPERATION>, <CELL_PIXELS>, <PIXEL_TIME>), where DATASET_NAME represents an identification of a dataset, T1 represents a start time of the portion of the dataset to retrieve, T2 represents an end time of the portion of the dataset to retrieve, MATH_OPERATION represents a mathematical operation to apply, CELL_PIXELS represents a number of available cell pixels, and PIXEL_TIME represents a time duration of a single pixel. As an illustrative example, if a function is LOOKUP_TS("DATASET1", 0:00:00, 0:10:00, MAX), where the identified dataset is "DATASET1," the start time is 0:00:00, the end time is 0:10:00, and the mathematical operation is a maximum value operation, then the query may be ("DATASET1", 0:00:00, 0:10:00, MAX, 100), ("DATASET1", 0:00:00, 0:10:00, MAX, 0:00:06), or ("DATASET1", 0:00:00, 0:10:00, MAX, 100, 0:00:06), where 100 is the number of available cell pixels and 0:00:06 is the time duration of a single pixel (e.g., determined as a result of subtracting 0:00:00 from 0:10:00 and dividing the result by 100). The query generator 112 can then transmit the query to the time-series data store 140 via the network 130. In some embodiments, the query generated by the query generator 112 using the function entered in a cell becomes the data description stored as the value of the cell.

Once the time-series data store 140 receives a query, the time-series data store 140 can identify the data corresponding to the query and return the corresponding data to the spreadsheet application 110 (e.g., the renderer 114). For example, the time-series data store 140 can identify the dataset identified in the query and retrieve a portion of the identified dataset identified in the received query. If the query includes one or more mathematical operations to perform on the retrieved data, then the time-series data store 140 can perform the mathematical operation(s) to form modified data. The time-series data store 140 can return a single value (e.g., if the mathematical operation is to calculate a statistical value, like the mean, maximum, minimum, etc.), a small set of values, or a large set of values to the spreadsheet application 110 (e.g., the renderer 114) in a query response, skipping some or all of the operations described below with respect to the time-series data store 140.

Optionally, in embodiments in which the query generator 112 sends the query so that the spreadsheet application 110 can display a sparkline, the time-series data store 140 can identify the number of available cell pixels (either by identifying the number included in the query or by determining whether multiple data values fall within a time duration of a single pixel). If the amount of retrieved or modified data (e.g., the number of data values retrieved or modified) is greater than the number of available cell pixels and the query does not include the time duration of a single pixel, then the time-series data store 140 can calculate the single pixel time duration (in a manner as described above), divide the retrieved or modified data into N number of data buckets (where each data bucket covers a single pixel time duration and N corresponds to the number of available cell pixels), identify the maximum and/or minimum data values within each data bucket, and generate a query response that includes the identified maximum and/or minimum data values for each data bucket.

If the amount of retrieved or modified data is greater than the number of available cell pixels and the query includes the time duration of a single pixel, then the time-series data store 140 can divide the retrieved or modified data into N number of data buckets (where each data bucket covers a single pixel time duration and N corresponds to the number of available cell pixels), identify the maximum and/or minimum data values within each data bucket, and generate a query response that includes the identified maximum and/or minimum data values for each data bucket. By including the maximum and/or minimum data values within the query response, the resulting displayed sparkline provides a user with a better understanding of the range of data values included in the complete dataset that correspond with a single cell pixel. In particular, information about extrema is not lost such that a period during which data values are a constant value would not look the same in the sparkline as a period during which data values oscillated around a mean value equal to the constant value.

Alternatively, instead of identifying the maximum and/or minimum data values within each data bucket, the time-series data store 140 can aggregate the data values within each data bucket (e.g., average the data values within each data bucket, determine the median value within each data bucket, determine a modal value within each data bucket, etc.) and include the aggregates data values in the query response.

If the amount of retrieved or modified data is less than the number of available cell pixels, then the time-series data store 140 can interpolate the retrieved or modified data such that the number of data values matches the number of available cell pixels, and generate a query response that includes the interpolated data. Similarly, if the amount of retrieved or modified data equals the number of available cell pixels, then the time-series data store 140 can generate a query response that includes the retrieved or modified data.

Optionally, the query generator 112 generates the query in a manner such that the time-series data store 140 returns a number of data values equaling the number of available cell pixels. For example, the query generator 112 can generate a query requesting a number of data values that equals the number of available cell pixels. Thus, the time-series data store 140 may not identify the number of available cell pixels using the query. Rather, the time-series data store 140 may perform the operations described above (e.g., identify maximum and/or minimum data values for each data bucket, perform interpolation, etc.) such that the query response includes a number of data values indicated by the query.

By generating a query for an amount of data that corresponds to a number of available cell pixels and/or a query response that includes an amount of data that corresponds to a number of available cell pixels, the spreadsheet application 110 does not have to perform any additional operations to avoid aliasing or pixilation issues when displaying a sparkline. For example, aliasing or pixilation issues could be caused by attempting to plot two data points in a single pixel or the same, single value in two consecutive pixels. However, as described below, the renderer 114 can use the data included in a query response to display a single value or a single vertical (or horizontal) line in each pixel.

Once the query response is generated, the time-series data store 140 can transmit the query response to the spreadsheet application 110 (e.g., the renderer 114). The renderer 114 can use the response to generate a sparkline or a value to display. For example, if the query response includes a single value or small set of values (e.g., because a result of the function entered in the cell is to display an integer data type), the renderer 114 can simply obtain the value(s) from the query response and generate a visualization of the value(s) (e.g., one or more number characters) for display in the cell in which the corresponding function is entered. The value of the cell may then be the value(s) (e.g., one or more number characters).

As another example, if a result of the function is to display a sparkline (e.g., a data description data type), the renderer 114 can obtain both the function and the query response. As described above, the function may include a display operation parameter. The renderer 114 can obtain the data included in the query response and generate a sparkline using the obtained data, formatting the resulting sparkline according to any display operation parameter included in the function. The generated sparkline may then be displayed in the cell, with the query used to obtain the data used to generate the sparkline (e.g., the data description) being the value of the cell. As an illustrative example, a function may be a sparkline generation function and include an operation to color the sparkline blue. Thus, the renderer 114 can obtain the data included in the query response and generate a blue-colored sparkline using the values of the obtained data for display in a cell. The value of the cell may then be the data description of the blue-colored sparkline (e.g., the query used to obtain the data used to generate the blue-colored sparkline).

In embodiments in which the data included in the query response includes a minimum and maximum value for each data bucket (e.g., each pixel), the renderer 114 can form the sparkline by, for each horizontal (or vertical) pixel, drawing a line from the respective minimum value to the respective maximum value. Thus, the sparkline can be a series of vertical (or horizontal) lines drawn in successive pixels. As an illustrative example, a first cell has a width of 3 pixels, the minimum value of the first horizontal pixel (e.g., first data bucket) is 0, the maximum value of the first horizontal pixel is 5, the minimum value of the second horizontal pixel (e.g., second data bucket) is 2, the maximum value of the second horizontal pixel is 4, the minimum value of the third horizontal pixel (e.g., third data bucket) is 3, and the maximum value of the third horizontal pixel is 10. Thus, the rendered sparkline can have a width of 3 pixels, where the first horizontal pixel depicts a vertical line from 0 to 5, the second horizontal pixel depicts a vertical line from 2 to 4, and the third horizontal pixel depicts a vertical line from 3 to 10.

In embodiments in which the data included in the query response includes an aggregated value, the renderer 114 can form the sparkline by, for each horizontal (or vertical pixel), drawing a point at the respective aggregated value. Thus, the sparkline can be a series of points drawn in successive pixels.

Once the sparkline is generated, the renderer 114 can display the sparkline in the cell in which the corresponding function is entered. Optionally, the renderer 114 can discard or delete the data used to render the sparkline (or the value or small set of values) once the rendering is complete. Thus, the data used to render the sparkline (or the value or small set of values) do not have to be imported into or stored in any cell of the spreadsheet application 110 file in order for the sparkline (or value or small set of values) to be displayed in a cell. Accordingly, the spreadsheet application 110 can reduce the memory usage of the user device 102 and/or reduce the file size of the spreadsheet application 110 file as compared with conventional spreadsheet applications.

In some embodiments, the renderer 114 generates a graphical file (e.g., an image) of the sparkline and displays the graphical file in the cell in which the corresponding function is entered. In other embodiments, the renderer 114 generates an interactive sparkline (e.g., a user can hover over or select the sparkline to view additional information, modify a formatting of the sparkline, etc.) and displays the interactive sparkline in the cell in which the corresponding function is entered.

Optionally, the renderer 114 caches the rendered sparkline, storing a version of the rendered sparkline in the cache 125. Thus, if a user performs any action that may require a re-painting of a user interface that depicts a cell displaying a rendered sparkline (e.g., the user closes a spreadsheet application 110 file and then re-opens the file, the user scrolls up or down in the spreadsheet application 110 file such that a cell displaying a rendered sparkline is no longer visible and then scrolls again such that the cell is visible once again, the user minimizes the spreadsheet application 110 to view other information on the user device 102 screen and then restores the spreadsheet application 110 for viewing on the user device 102 screen, etc.), the spreadsheet application 110 can retrieve the rendered sparkline from the cache 125 for display in response to reception of the re-paint operation rather than repeating the process of generating a query, retrieving data from the time-series data store 140, and rendering the retrieved data.

In an embodiment, the stored value of the cell in which the function is entered is not the generated sparkline or the data values used to generate the sparkline. Rather, the value of the cell remains the data description (e.g., the query that describes the data values to retrieve to render the sparkline) even though a sparkline is displayed in the cell. As described herein, storing the data description in a cell allows other applications executing on the user device 102, such as the graph application 120, to generate interactive graphs of the data referenced by the data description when the data description is dragged to these other applications.

For example, the user device 102 can simultaneously execute the spreadsheet application 110 and the graph application 120. A user may enter a function into a first cell of the spreadsheet application 110, and the spreadsheet application 110 can generate and display a corresponding sparkline in the first cell. The user may then drag, copy, or otherwise move the data description stored as the value of the first cell from the first cell in the spreadsheet application 110 to the graph application 120. The user can also export the data description to another application running on the user device 102, to another application running on another computing device, to a data store for storage, and/or the like. Dragging, copying, or otherwise moving the data description to the graph application 120 may cause the graph application 120 to retrieve a portion of a dataset referenced by the data description and generate and display a graph of the retrieved portion (e.g., in a manner as described above with respect to the spreadsheet application 110). The generated graph can be static (e.g., an image) or interactive. In embodiments in which the generated graph is interactive, a user may manipulate the graph (e.g., change the graph formatting, add markers, select a subset of the plotted data for display, scroll or pan in a direction to view additional data not originally referenced by the data description, change the graph from one graph type to another graph type, etc.).

In response to this manipulation, the graph application 120 can update the display of the graph. In addition, the graph application 120 can automatically transmit an indication of the modification to the spreadsheet application 110. For example, the indication can include an updated data description, an identification of any operation that occurred, and/or the like. In embodiments in which the modification results in a change to the data to be included in a rendered sparkline or a change to the formatting of the rendered sparkline (which can include a change to the type of graph to display) and the cached version of the rendered sparkline is static, the query generator 112 can generate a modified query based on the indication of the modification (e.g., reference an updated portion of a dataset, identify a mathematical operation to perform on the data, etc.) and the original function entered in the first cell. The query generator 112 can then transmit the modified query to the time-series data store 140. In response, the renderer 114 can receive corresponding data, generate an updated sparkline based on the received data, format the updated sparkline according to any display operations (either included in the original function or in the indication of the modification), and display the updated sparkline in the first cell. In embodiments in which the modification results in a change to the formatting of a rendered sparkline and the cached version of the rendered sparkline is interactive, the renderer 114 can simply retrieve the cached version of the rendered sparkline, adjust the formatting of the rendered sparkline to match or nearly match the formatting performed in the graph application 120 (e.g., change the color of the sparkline, change the sparkline into a bar graph, etc.), and display the formatted sparkline in the first cell. Accordingly, modifying a graph corresponding to a data description and displayed in the graph application 120 can cause a matching modification to a sparkline corresponding to the data description and displayed in a cell in the spreadsheet application 110. In some embodiments, the reverse is also true—modifying a sparkline corresponding to a data description and displayed in a cell in the spreadsheet application 110 can cause a matching modification to a graph corresponding to the data description and displayed in the graph application 120.

In some embodiments, a first function entered in a first cell is referenced by a second function entered in a second cell. The reference can simply be the row and column of the first cell. For example, the first function may result in the display of a first sparkline and the second function may result in the display of a second sparkline that is a modified version of the first sparkline. To retrieve data used to render the first sparkline, the query generator 112 can generate a query using the first function. To retrieve data used to render the second sparkline, the query generator 112 can generate a modified query using the first and second functions. As an illustrative example, the first function may be a function that instructs the spreadsheet application 110 to render a first sparkline based on a first dataset identified in a first parameter included in the first function. The second function may be a function that instructs the spreadsheet application 110 to render a second sparkline that is a 1 day rolling average of the data values referenced by the first function. The query generator 112 can use the first and second functions to generate a modified query that identifies the first dataset (as identified in the first function), a mathematical operation to perform on the data referenced by the first function (e.g., a 1 day rolling average, as identified in the second function), a number of available cell pixels, and/or a time duration of a single pixel. The value of the first cell may then be a first data description corresponding to a query generated by the query generator 112 using the first function and the value of the second cell may be a second data description corresponding to the modified query.

As another example, the first function may result in the display of a first sparkline and the second function may result in the display of a single value corresponding to the data values used to render the first sparkline. Similar to as described above, the query generator 112 can generate a modified query using the first and second functions to retrieve the single value. As an illustrative example, the first function may be a function that instructs the spreadsheet application 110 to render a first sparkline based on a first dataset identified in a first parameter included in the first function. The second function may be a function that instructs the spreadsheet application 110 to determine a minimum value of the data values referenced by the first function. The query generator 112 can use the first and second functions to generate a modified query that identifies the first dataset (as identified in the first function) and a mathematical operation to perform on the data referenced by the first function (e.g., calculate the minimum value, as identified in the second function). The value of the first cell may then be a first data description corresponding to a query generated by the query generator 112 using the first function and the value of the second cell may be a second data description corresponding to the modified query.

While the present disclosure describes embodiments in which one function is referenced by a second function, this is not meant to be limiting. A user can create a cascading series of functions, where a first function is referenced by a second function, a second function is referenced by a third function, and so on. Thus, the query generator 112 can combine any number of functions in order to generate a query for the retrieval of data for display (either as value(s) or a sparkline).

In further embodiments, a first function entered in a first cell is referenced by a second function entered in a second cell, where the second function further includes a conditional formatting display operation parameter. For example, the first function may result in the display of a first sparkline and the second function may result in the display of a single value corresponding to the data values used to render the first sparkline. The single value, however, may be formatted in a certain manner based on whether a condition occurs. Similar to as described above, the query generator 112 can generate a modified query using the first and second functions to retrieve the single value. As an illustrative example, the first function may be a function that instructs the spreadsheet application 110 to render a first sparkline based on a first dataset identified in a first parameter included in the first function. The second function may be a function that instructs the spreadsheet application 110 to determine a minimum value of the data values referenced by the first function, to color the character(s) representing the minimum value black if the minimum value exceeds a threshold value, and to color the character(s) representing the minimum value red if the minimum value does not exceed the threshold value. The query generator 112 can use the first and second functions to generate a modified query that identifies the first dataset (as identified in the first function) and a mathematical operation to perform on the data referenced by the first function (e.g., calculate the minimum value, as identified in the second function). Once the minimum value is received as part of a query response, the renderer 114 can use the minimum value and the conditional formatting display operation parameter included in the second function (e.g., color the character(s) representing the minimum value black if the minimum value exceeds a threshold value and color the character(s) representing the minimum value red if the minimum value does not exceed the threshold value) to display either black or red character(s) representing the minimum value in the second cell.

The conditional formatting display operation parameter may be useful in live updating use cases. For example, the spreadsheet application 110 can use the data description functionality to implement the live updating of sparklines and/or values displayed in the cells of the spreadsheet application 110. A first cell in the spreadsheet application 110 can store a current timestamp that is updated periodically (e.g., every second, every 10 seconds, every 30 seconds, every minute, etc.). A second cell in the spreadsheet application 110 can store a function that references the first cell and results in a second timestamp. As an illustrative example, the second cell can store a subtraction operation, with a first parameter of the subtraction operation referencing the first cell and a second parameter of the subtraction operation referencing a first amount of time (e.g., 1 second, 1 minute, 1 hour, etc.). Thus, the second timestamp displayed in the second cell is always a first amount of time less than the current timestamp, even as the current timestamp is periodically updated. A combination of the first cell and the second cell then form a time window. In a third cell in the spreadsheet application 110, a first function can be entered that references a first dataset, the first cell, and the second cell. In particular, the first cell can be referenced by a parameter corresponding to the end of a time window and the second cell can be referenced by a parameter corresponding to the start of the time window. Accordingly, the first function identifies a first dataset and a particular time window of data from the first dataset to retrieve for display as a sparkline. The query generator 112 can generate a query corresponding to this first function and the renderer 114 can render and display a sparkline in the third cell based on the data retrieved from the time-series data store 140. The value of the third cell is then a first data description (e.g., the generated query). When the current timestamp stored in the first cell is updated, this causes the value displayed in the second cell to update. This update also causes the query generator 112 to generate a modified query because the time window of data to display in the sparkline has now changed (e.g., from a first time window corresponding to the current time (e.g., 01:00:00) and 1 minute before the current time (e.g., 00:59:00) to a second time window corresponding to the current time (e.g., now 01:00:30 if the current timestamp updates every 30 seconds) and 1 minute before the current time (e.g., 00:59:30)). The renderer 114 can then render and display an updated sparkline in the third cell based on the updated data retrieved from the time-series data store 140. The value of the third cell then becomes a modified data description (e.g., the modified query). The query generator 112 and renderer 114 can repeat this process each time the current timestamp is updated, thereby resulting in a periodic, live update to the sparkline displayed in the third cell without any user intervention or modification to the stored cell values.

In general, any change that occurs to a cell displayed in a spreadsheet application 110 (e.g., a resizing of cells, a reformatting of cells, a change to a function entered in a cell, a change to text stored in a cell, a change to a value stored in a cell, a change to a data description stored in a cell, a change to a sparkline or value displayed in a cell, etc.) can trigger a notification to the query generator 112 identifying the change. The query generator 112 may, when appropriate, generate a modified query for any cells that changed or that reference a cell that changed, and the renderer 114 can render updated sparklines or values for display. The value of the cell may then be updated to reflect the modified query. As an illustrative example, resizing a cell that displays a sparkline may result in an increased and/or a reduced number of available cell pixels. The query generator 112 can then generate a modified query that includes an updated number of available cell pixels and/or an updated time duration for a single pixel. The renderer 114 then receives updated data from the time-series data store 140 in response to the query and can render an updated sparkline for display in the resized cell. In embodiments in which a cell displaying a sparkline is resized to a larger size, the spreadsheet application 110 may initially scale the original sparkline for display in the resized cell (which may result in a pixelated sparkline). Once the renderer 114 has rendered the updated sparkline, the renderer 114 can then replace the scaled original sparkline with the updated sparkline (thereby replacing the pixelated sparkline with a non-pixelated sparkline).

Similar to conditional formatting, the spreadsheet application 110 can generate notifications when certain conditions occur. For example, a user can define an indicator time series in the spreadsheet application 110, where the indicator time series is one value (e.g., 0) if a condition is true and is another value (e.g., 1) if a condition is false, or vice-versa. In particular, a first cell in the spreadsheet application 110 can have a first function entered that identifies a portion of a first dataset, a mathematical operation to apply to the data portion, and a notification operation. The mathematical operation can be to return a first value (e.g., 0) if a value in the data portion is above a threshold value (e.g., a temperature value is above 100 degrees) and to return a second value (e.g., 1) if a value in the data portion is not above the threshold value (e.g., a temperature value is 100 degrees or below). The notification operation can result in the generation of a notification by the notification generator 116 if the value returned is the second value instead of the first value, or vice-versa. Optionally, the notification operation is included as part of a second function entered in a second cell that references the first cell. The renderer 114 can then receive the value returned by the time-series data store 140 and display the value in the first cell. In some embodiments, the first function further references another cell that stores a periodically updated current timestamp such that the value displayed in the first cell is periodically updated automatically.

If the condition identified by the notification operation is satisfied, the notification generator 116 is notified. The notification generator 116 can then generate a notification or alert that notifies a user that the condition is satisfied. The notification or alert can be displayed in the spreadsheet application 110, displayed in a separate (optionally pop-up) window viewable in a user interface generated by the user device 102, transmitted to another user device 102 via the network 130 (e.g., as a text message, as a chat message, etc.), transmitted to another computing system via the network 130 as an electronic message (e.g., an email server), and/or the like.

In further embodiments, the notification can be based on two or more datasets. For example, a first cell in the spreadsheet application 110 can have a first function entered that identifies a portion of a first dataset and a mathematical operation to apply to the data portion. A second cell in the spreadsheet application 110 can have a second function entered that identifies a portion of a second dataset and a mathematical operation to apply to the second data portion. Finally, a third cell in the spreadsheet application 110 can have a third function entered that references the first cell and the second cell and that includes a notification operation. In particular, the notification operation can result in the generation of a notification by the notification generator 116 if a combination of the displayed value in the first cell and the displayed value in the second cell satisfies a certain condition. As one illustrative example, the third function causes the notification generator 116 to generate a notification if the value displayed in the first cell and the value displayed in the second cell are both a first value (e.g., 1). As another illustrative example, the third function causes the notification generator 116 to generate a notification if at least one of the value displayed in the first cell or the value displayed in the second cell is a first value (e.g., 1).

The spreadsheet application 110 additionally allows a user to pull (e.g., copy, drag, paste, etc.) a function entered in in a first cell to one or more other cells. As a result, any parameters included in the function that are dependent on the location of the first cell may be updated automatically to reflect the position(s) of the other cell(s). This functionality allows a user to copy one function entered in one cell to other cells such that all of the functions perform the same function on a different set of data without requiring the user to individually modify the copied functions to prevent the same function from being performed on the same set of data. The query generator 112 can then obtain the updated functions stored in the other cells, and generate corresponding queries for the retrieval and display of data in the other cells (e.g., as a value, as a sparkline, etc.).

As an illustrative example, a first cell in the spreadsheet application 110 can be located at "A1" and have a first function entered that identifies a first dataset, a second cell in the spreadsheet application 110 can be located at "B1" and have a second function entered that identifies a second dataset, and a third cell in the spreadsheet application 110 can be located at "C1" and have a third function entered that identifies a third dataset. Thus, the first cell displays a first sparkline, the second cell displays a second sparkline, and the third cell displays a third sparkline. In addition, a fourth cell in the spreadsheet application 110 can be located at "A2" and have a fourth function that references the first cell and that identifies a mathematical operation to perform on the first cell (e.g., determine the average value of the data values referenced by the first cell). The fourth cell then displays the result of the mathematical operation. In particular, the fourth function can be in the following format: STATS(A1, 'mean'). The "$" symbol (or another symbol, such as #, &, *, etc.) can be used to signify that the value of the character following the symbol (e.g., "A" and "1") is not dependent on the location in which the fourth function is entered. An absence of any such symbol may indicate that the value of the character is dependent on the location in which the fourth function is entered. If the fourth function is copied to another cell, the value of the character following the symbol will update automatically based on the location of the cell to which the fourth function is copied. Specifically, if the fourth function is copied to a cell X rows up or down from the fourth cell and/or to a cell Y columns to the left or right of the fourth cell, then the value of the character following the symbol that represents the row location (e.g., "1") will be updated by −X (if the fourth data description is copied X rows up) or by X (if the fourth data description is copied X rows down), and the value of the character following the symbol that represents the column location (e.g., "A") will be updated by −Y (if the fourth data description is copied Y columns to the left) or by Y (if the fourth data description is copied Y columns to the right). Thus, if a user pulls the fourth function into a fifth cell located at "B2" and a sixth cell located at "C2," then the resulting fifth function entered in the fifth cell will be STATS(B1, 'mean') and the resulting sixth function entered in the sixth cell will be STATS(C1, 'mean'). Accordingly, the fifth and sixth functions define the same mathematical operation as the fourth function, but are automatically updated to perform the mathematical operation on a different set of data (e.g., the second dataset and the third dataset, respectively, instead of the first dataset).

Once the fourth function is copied to the fifth and sixth cells and the entered fifth and sixth functions are automatically modified to include references to different cells (e.g., "B1" and "C1," respectively), the query generator 112 can obtain the fifth and sixth functions, generate a query for each function, and transmit the queries to the time-series data store 140. The time-series data store 140 can then return to the renderer 114 data corresponding to the fifth cell and data corresponding to the sixth cell, and the renderer 114 can display the returned data in the corresponding cells.

The spreadsheet application 110 can also allow a user to view an enlarged version of a sparkline displayed in a cell. For example, a user can click, hover over, or otherwise select a sparkline, which causes the spreadsheet application 110 to enlarge the cell in which the sparkline is displayed, generate and display a new window (that has a size larger than the cell in which the sparkline is displayed) to display an enlarged sparkline, and/or the like. In response, the query generator 112 can determine the number of available cell pixels in the enlarged cell or new window and/or a time duration of a single pixel in the enlarged cell or new window, generate a modified query based on the number of available cell pixels (e.g., requesting a sparkline, or other data visualization, with the specific number of cell pixels) and/or the time duration of a single pixel (and/or based on any additional information included in the function entered in the cell), and transmit the modified query to the time-series data store 140. The renderer 114 can then use the data received from the time-series data store 140 to generate an updated, higher resolution sparkline for display in the enlarged cell or new window. In some embodiments, the spreadsheet application 110 may initially scale the original sparkline for display in the enlarged cell or new window (which may result in a pixelated sparkline). Once the renderer 114 has rendered the updated sparkline, the renderer 114 can then replace the scaled original sparkline with the updated sparkline (thereby replacing the pixelated sparkline with a non-pixelated sparkline).

As used herein, the term "data store" is broad term for any data structure for storing and/or organizing data, including, but not limited to, relational databases (Oracle database, mySQL database, etc.), non-relational databases (for example, a NoSQL database), an in-memory database, spreadsheets, XML files, and text file, among others. The various terms "database," "storage," "data store," and "data source" may be used interchangeably in the present disclosure. Such data structures may be configured to store computer-executable instructions that may communicate with various hardware processors to cause said processors to perform various functions.

The user device 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

In other embodiments, not shown, the spreadsheet application 110, the graph application 120, and/or other applications are executed by a physical computing system remote from the user device 102, such as a network-accessible server accessed by the user device 102 via the network 130. The network-accessible server can run the applications 110 and 120, generating user interface data that is transmitted to the user device 102 via the network 130. An application running in the user device 102, such as a browser application, can execute the user interface data, which causes the browser application to display an interactive user interface depicting one or more cells. For example, the user interface data can cause the user device 102 to display any of the user interfaces depicted in FIGS. 4A-4C and 5A-5B. The user, via the browser application, can then interact with the interactive user interface to enter functions, modify sparklines, and/or perform any of the other operations described herein. When a user enters a function into a cell, the browser application can transmit the function to the network-accessible server, and the query generator 112 (which is now operating in the network-accessible server) can then generate and transmit a query to the time-series data store 140 as described herein. The renderer 114 (which is now operating in the network-accessible server) can receive the query response from the time-series data store 140, render a sparkline or value using data included in the query response, and modify the user interface data such that execution of the modified user interface data causes the browser application to display the sparkline or value in a cell depicted in the interactive user interface. The renderer 114 can then transmit the modified user interface data to the user device 102.

The spreadsheet application 110 can be used for various use cases. For example, the spreadsheet application 110 can be used for displaying industrial production data, oil and gas industry data, healthcare data (e.g., pharmaceutical batch failure data over time, the number of claims filed over time, etc.), financial data (e.g., a stock ticker or the price of various commodities over time), polling data (e.g., the number of respondents that view an issue favorably or unfavorably in polls conducted over a period of time), aerospace production data, sensor data, and/or other types of data captured over a period of time (e.g., time-series data).

While the time-series data store 140 is depicted in FIG. 1 as being external to the user device 102, this is not meant to be limiting. For example, the time-series data store 140 can be located internal to the user device 102. In embodiments in which the spreadsheet application is executed by a network-accessible server, the time-series data store 140 can be located internal or external to the network-accessible server.

In an embodiment, the network 130 includes any communications network, such as the Internet. The network 130 may be a wired network, a wireless network, or a combination of the two. For example, network 130 may be a local area network (LAN) and/or a wireless area network (WAN).

Example Block Diagram for Displaying a Graph

Figure 2:
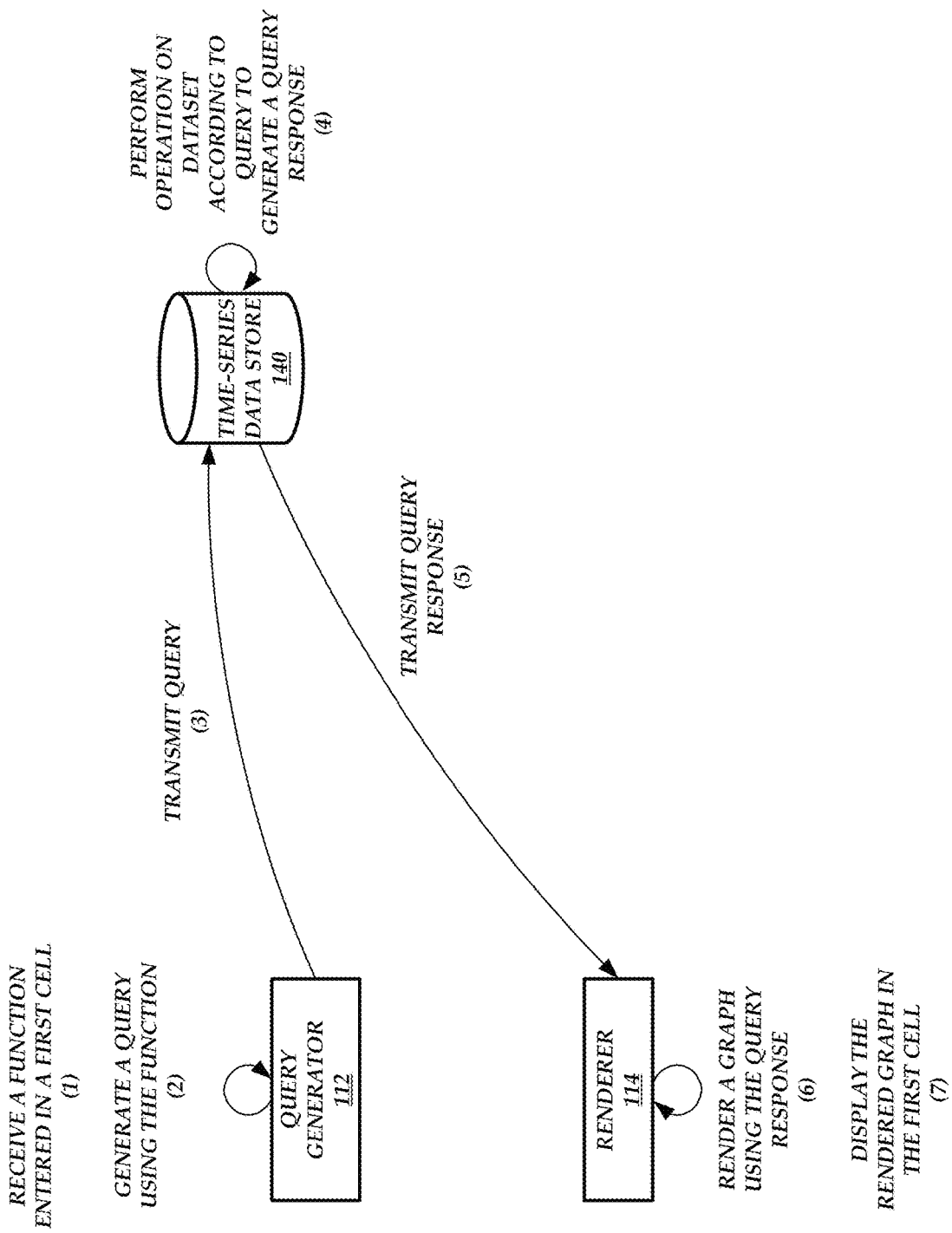
FIG. 2 is a block diagram of the operating environment of FIG. 1 illustrating the operations performed by the components of the operating environment to display a graph in a cell, according to one embodiment.

FIG. 2 is a block diagram of the operating environment 100 of FIG. 1 illustrating the operations performed by the components of the operating environment 100 to display a graph in a cell, according to one embodiment. As illustrated in FIG. 2, the query generator 112 receives a function entered in a first cell at (1). The function can identify a function type and one or more optional parameters, and the query generator 112 can use the information included in the function to generate a query at (2). The query generator 112 can then transmit the query to the time-series data store 140 at (3).

The query can define a portion of a dataset to retrieve and/or any operations to perform on the portion. Accordingly, the time-series data store 140 can perform an operation on an indicated dataset according to the query to generate a query response at (4). For example, the query response can include the result of performing or applying an operation on an indicated set of data. The time-series data store 140 can transmit the query response to the renderer 114 at (5).

The renderer 114 can render a graph using the query response at (6). For example, the renderer 114 can obtain the data included in the query response and plot the corresponding data values to form the graph. As described herein the graph can be a line graph, bar graph, pie graph, sparkline, X-Y scatterplot, a chart, another data visualization, etc. The rendered graph can be static (e.g., a graphical file) or interactive (e.g., a vector-based graphical format in which one or more lines, points, etc. can be modified by a user).

The renderer 114 can then display the rendered graph in the first cell at (7). As described herein, the stored value of the first cell, however, is not the rendered graph. Rather, the stored value of the first cell is the data description (e.g., the query). In addition, none of the data values used to render the graph are required to be stored in the cells of the spreadsheet application 110. The spreadsheet application 110 can optionally discard or delete the data values used to render the graph once the rendering is complete, thereby increasing the amount of memory available to the spreadsheet application 110 and/or other computing resources and/or reducing the file size of the spreadsheet application 110 file as compared with conventional spreadsheet applications.

Example Block Diagram for Automatically Modifying a Graph

Figure 3:
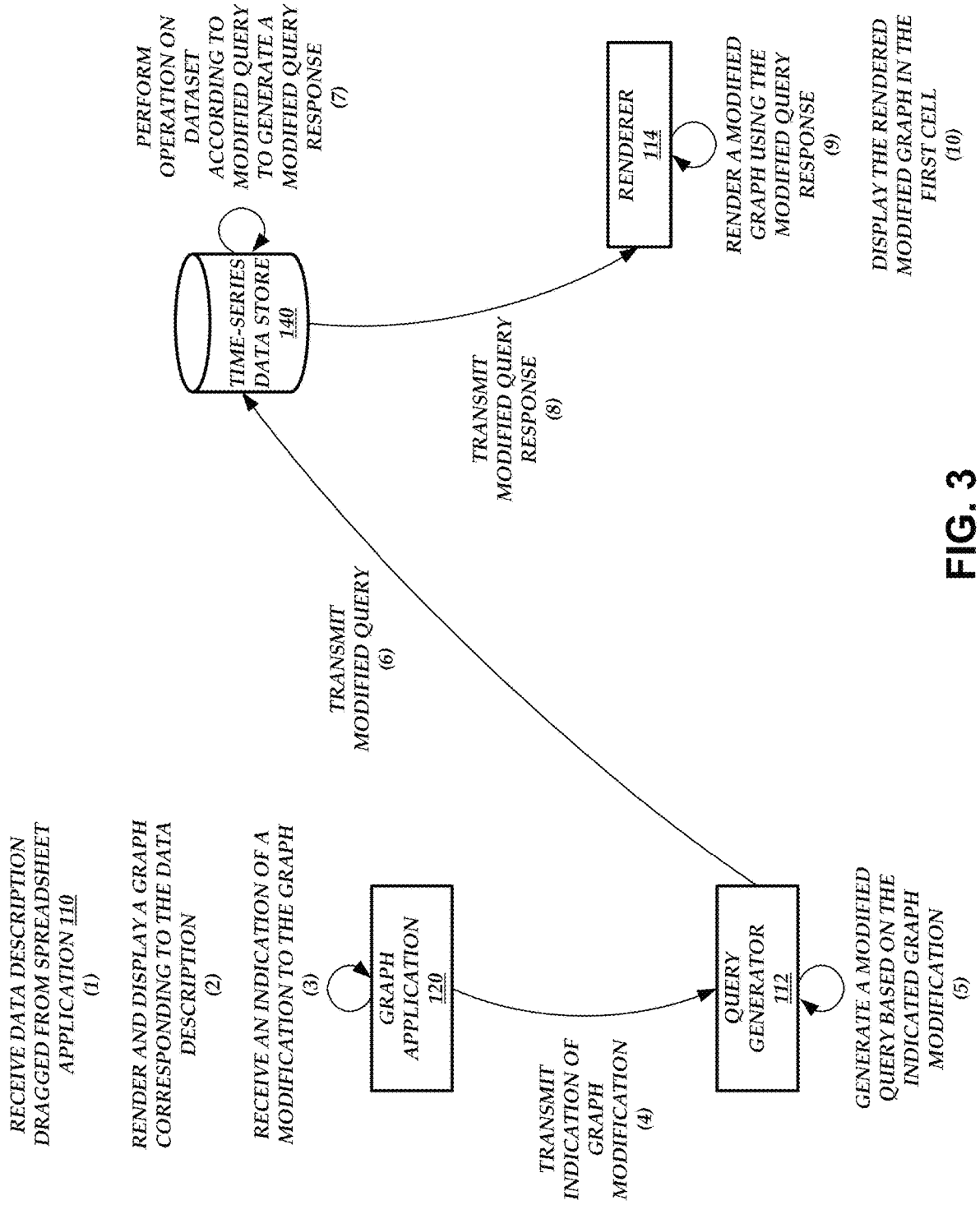
FIG. 3 is a block diagram of the operating environment of FIG. 1 illustrating the operations performed by the components of the operating environment to modify the graph displayed in one cell based on a modification to the graph made in another application, according to one embodiment.

FIG. 3 is a block diagram of the operating environment 100 of FIG. 1 illustrating the operations performed by the components of the operating environment 100 to modify the graph displayed in one cell based on a modification to the graph made in another application, according to one embodiment. As illustrated in FIG. 3, the graph application 120 receives a data description dragged from the spreadsheet application 110 at (1). In the spreadsheet application 110, the data description may have been stored in a first cell as a result of a user entering a function in the first cell. Entering the function in the first cell may have caused the query generator 112 to generate and transmit a query, and may have caused the renderer 114 to render and display a graph in the first cell based on data received as a result of the query.

In response to receiving the data description, the graph application 120 can render and display a graph corresponding to the data description at (2). For example, like the spreadsheet application 110, the graph application 120 can generate a query using the data description (e.g., use the data description as the query) for transmission to the time-series data store 140, and the graph application 120 can then render the graph using the retrieved data.

As described herein, the graph displayed in the graph application 120 can be interactive. Thus, a user can modify the graph, and the graph application 120 then receives an indication of a modification to the graph at (3). In response, the graph application 120 displays an updated graph based on the modification (e.g., changes the color of a line from red to blue, changes the thickness of a line from one weight to another weight, adds a marker to the graph, changes the type of graph from a line graph to a bar graph, etc.). In addition, the graph application 120 transmits an indication of a graph modification to the query generator 112 of the spreadsheet application 110 at (4).

The query generator 112 can generate a modified query based on the indicated graph modification at (5). For example, the query generator 112 can generate a modified version of the original query used to render a graph based on the indicated graph modification. The query generator 112 can then transmit the modified query to the time-series data store 140 at (6).

The modified query can define a portion of a dataset to retrieve and/or any operations to perform on the portion. Accordingly, the time-series data store 140 can perform an operation on an indicated dataset according to the modified query to generate a modified query response at (7). The time-series data store 140 can transmit the modified query response to the renderer 114 at (8).

The renderer 114 can render a modified graph using the modified query response at (9). For example, the renderer 114 can obtain the data included in the modified query response and plot the corresponding data values to form the modified graph. The renderer 114 can then display the rendered modified graph in the first cell at (10).

Example Spreadsheet Application User Interfaces

Figure 4A:
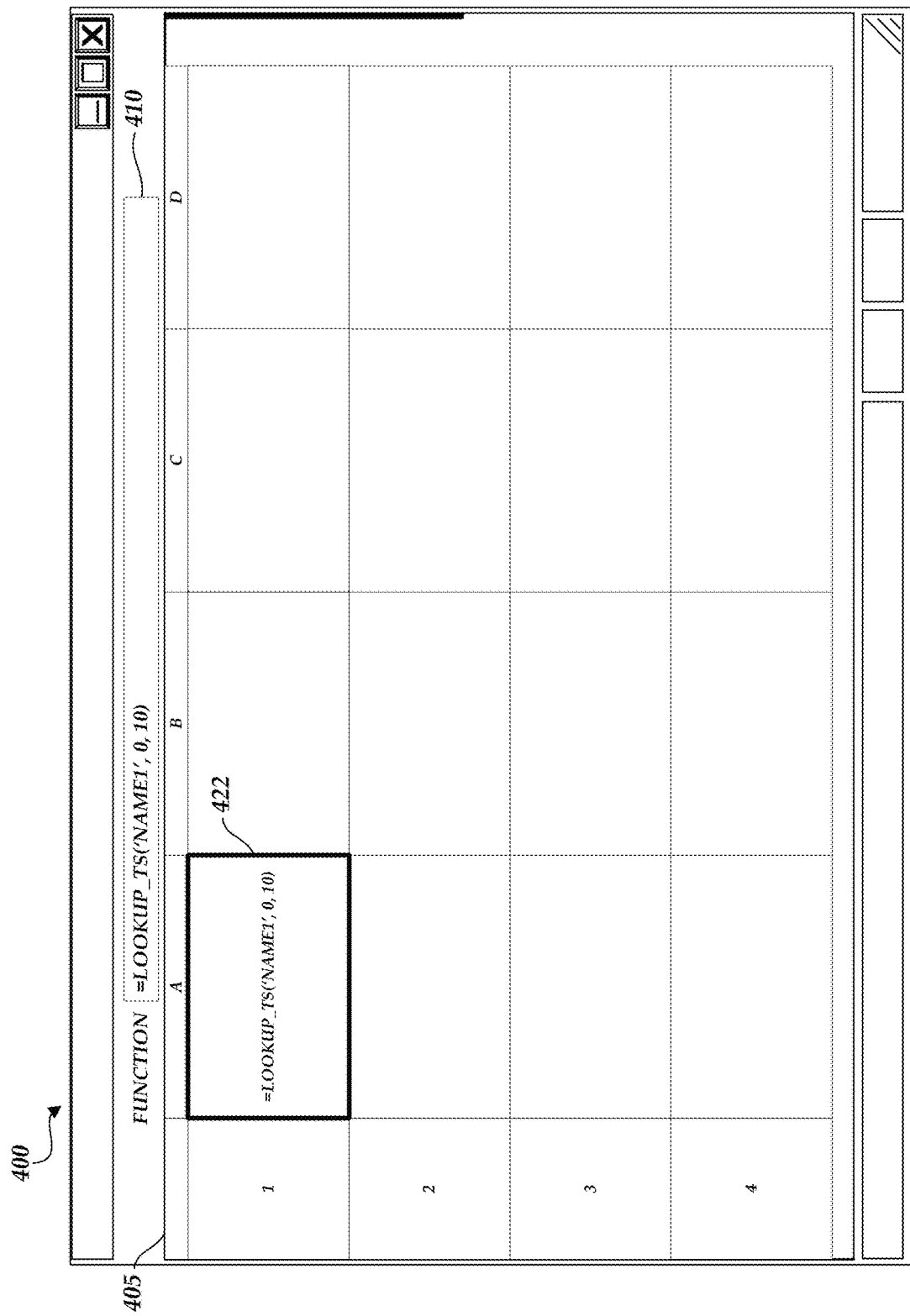
FIGS. 4A-4C illustrate a user interface displaying various cells.
Figure 4B:
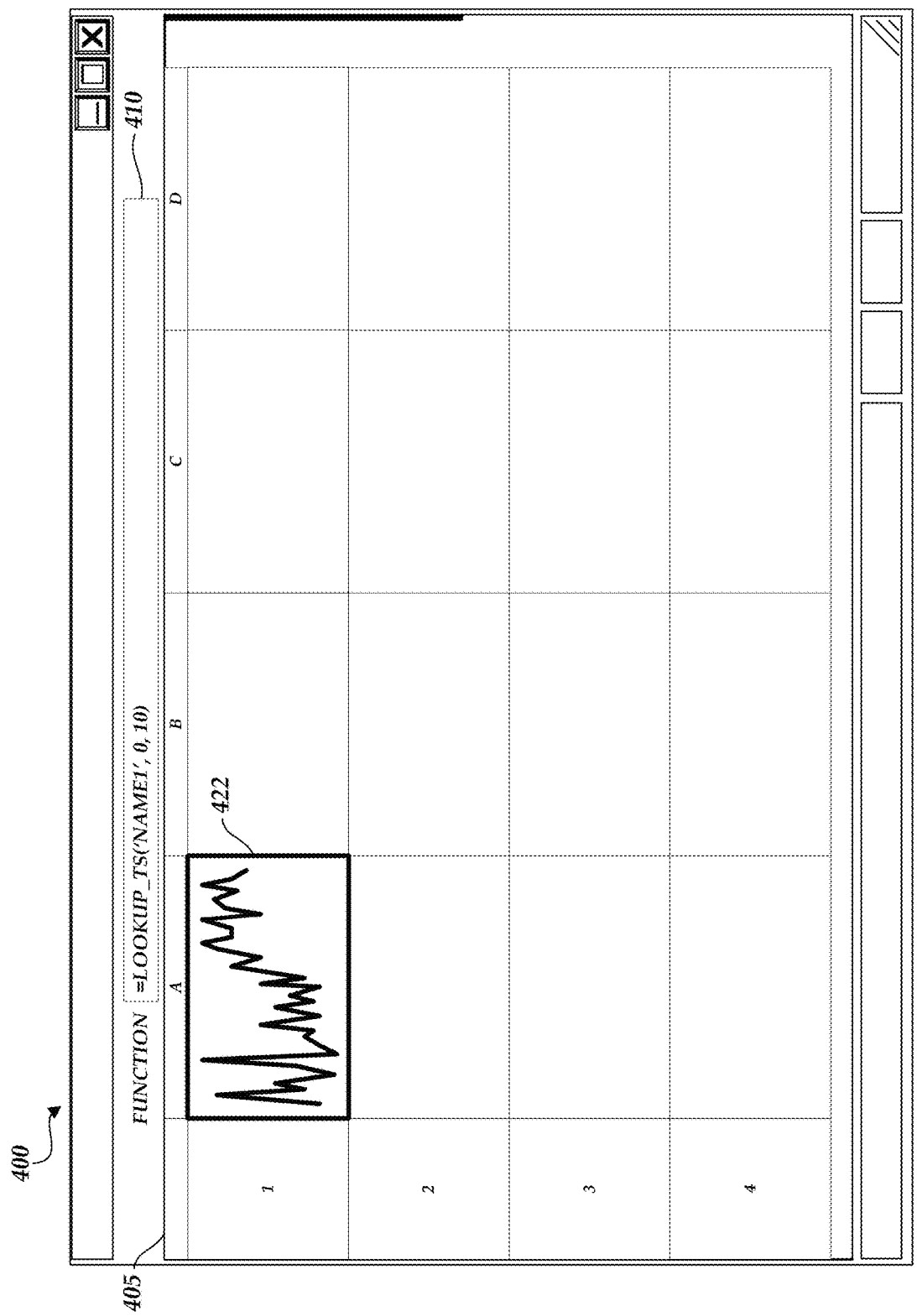
Figure 4C:
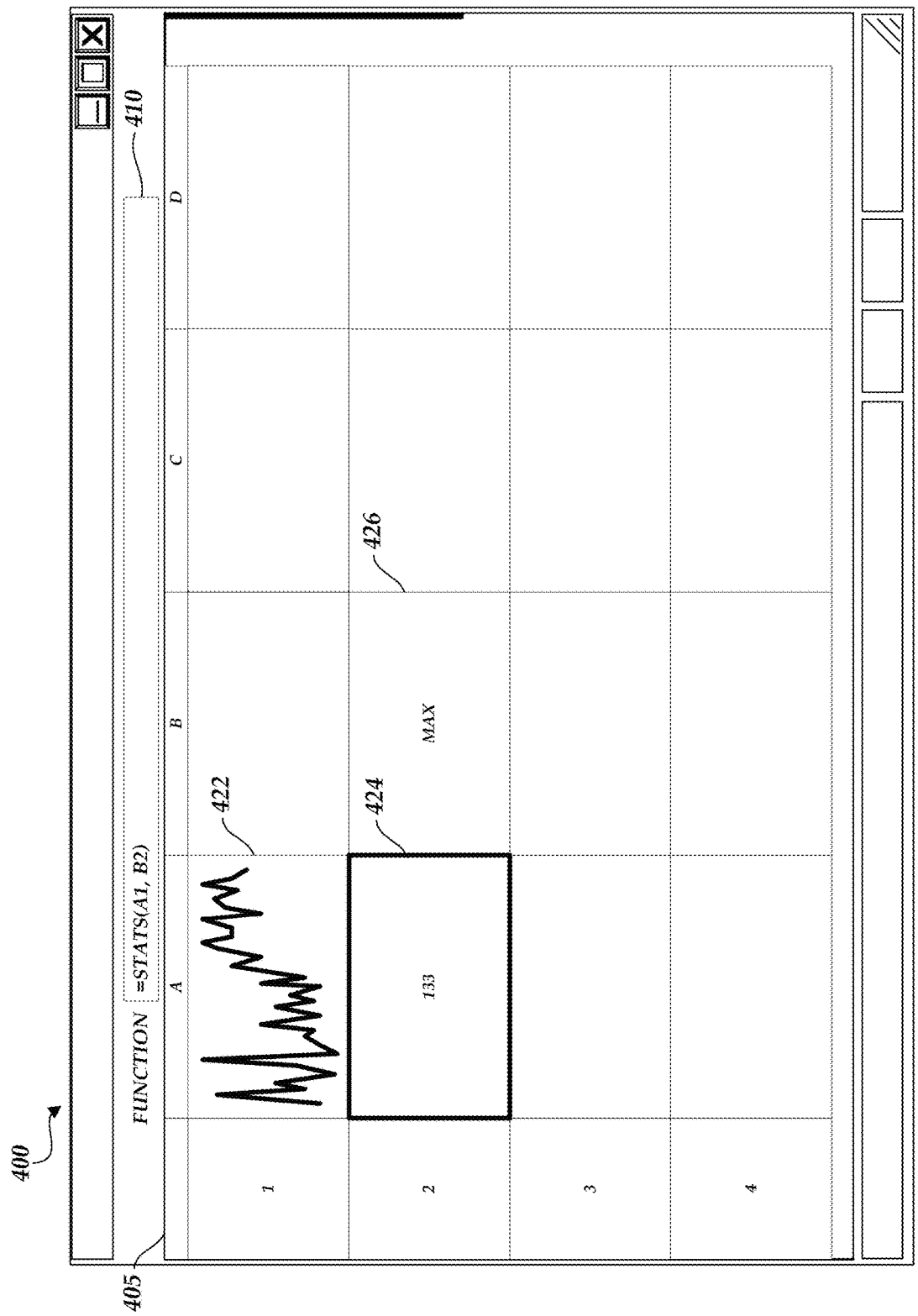

FIGS. 4A-4C illustrate a user interface 400 displaying various cells. The user interface 400 can be displayed by the user device 102 and user interface data that causes the user device 102 to display the user interface 400 can be generated by the spreadsheet application 110 executing on the user device 102 or executing on a network-accessible server.

As illustrated in FIG. 4A, the user interface 400 includes a window 405 that includes various cells. The cells are identified by row (e.g., row 1, row 2, row 3, etc.) and column (e.g., column A, column B, column C, etc.). In an embodiment, a user enters a function in either field 410 (after selecting cell 422) or directly in cell 422. As an illustrative example, the function is "LOOKUP_TS('NAME1', 0, 10)," which is a function directed to the retrieval and display (e.g., as a sparkline) of a portion of a dataset identified as "NAME1." Specifically, the function is directed to the retrieval and display of data values in the dataset that fall within a time window defined by a start time (e.g., "0") and an end time (e.g., "10").

Once the user finishes entering the function (e.g., as indicated by the user pressing the "enter" key, clicking a mouse, pressing an arrow key, etc.), the query generator 112 can obtain the function and begin the process for displaying a sparkline in the cell 422. As illustrated in FIG. 4B, the renderer 114 has finished rendering the sparkline and the sparkline is therefore displayed in the cell 422. However, as described herein, the value of the cell 422 is not the sparkline. Rather, the value of the cell 422 is the data description (e.g., a query generated using the function entered in the field 410).

In further embodiments, the user can enter other functions into other cells that reference the cell 422 data description. For example, as illustrated in FIG. 4C, the user enters the function indicated in the field 410 in the cell 424. As an illustrative example, the function entered in the cell 424 is "STATS(A1, B2)," which is a function directed to applying a mathematical operation indicated in the cell located at B2 (e.g., cell 426) to the dataset referenced by the data description stored in the cell located at A1 (e.g., the cell 422). Here, the cell 426 stores the text "MAX," which corresponds to a mathematical operation to calculate a maximum value. In addition, as described above, the cell 422 references data values of the "NAME1" dataset that fall within a time window defined by a start time (e.g., "0") and an end time (e.g., "10").

In response to entering this function, the query generator 112 obtains the function and generates a second query. The second query can be derived from a combination of the function entered in the cell 422 and the function entered in the cell 424 (or a combination of the data description stored in the cell 422 and the function entered in the cell 424). In particular, the second query can reference the dataset "NAME1" referenced by the function entered in the cell 422, the time window referenced by the function entered in the cell 422, and the mathematical operation referenced by the function entered in the cell 424. The query generator 112 can transmit the second query to the time-series data store 140, the time-series data store 140 can return a corresponding value to the renderer 114 (e.g., a maximum value of the data values of the "NAME1" dataset that fall within the time window), and the renderer 114 can display a visualization of the returned value (e.g., 133).

Figure 5A:
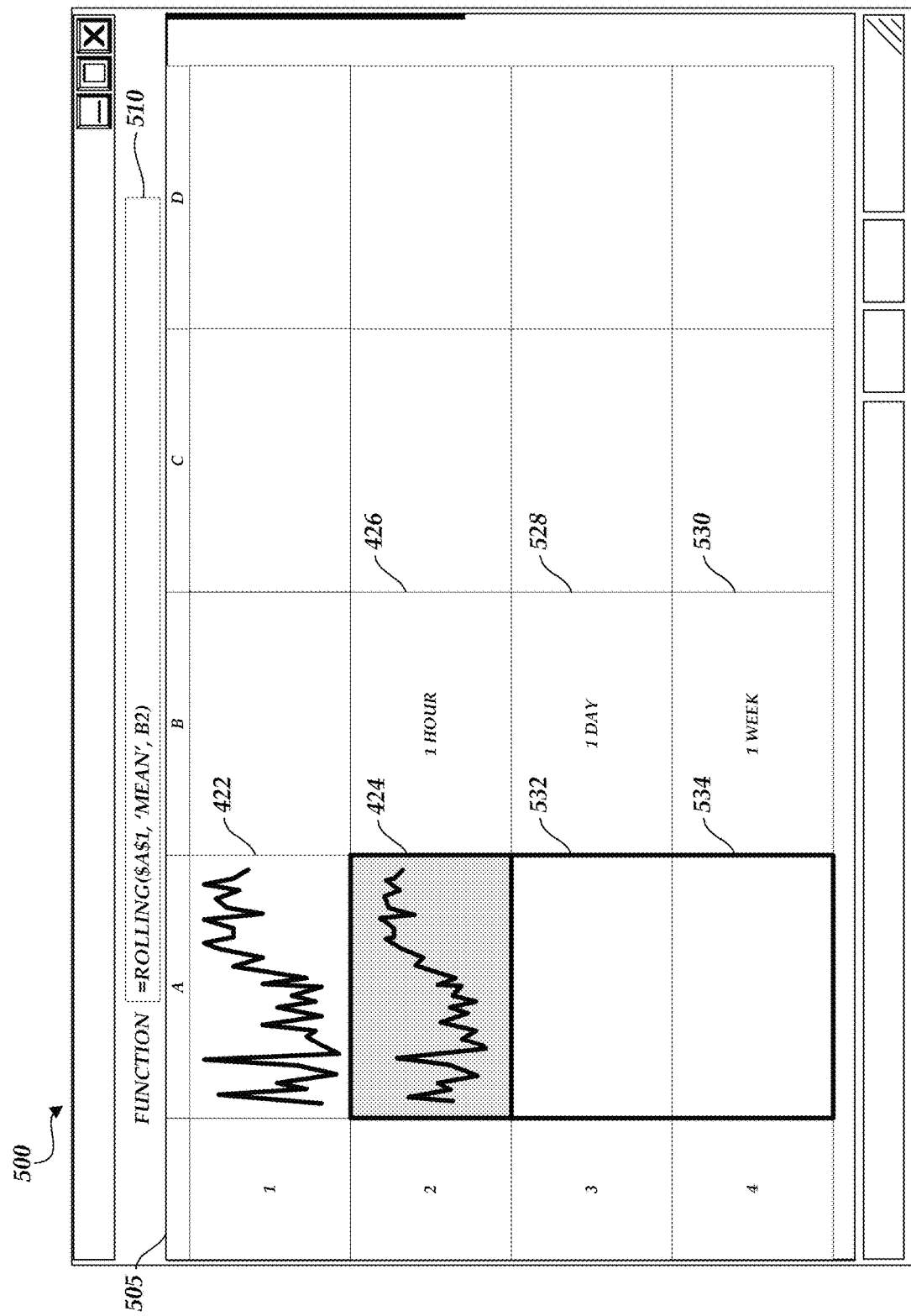
FIGS. 5A-5B illustrate another user interface displaying various cells.
Figure 5B:
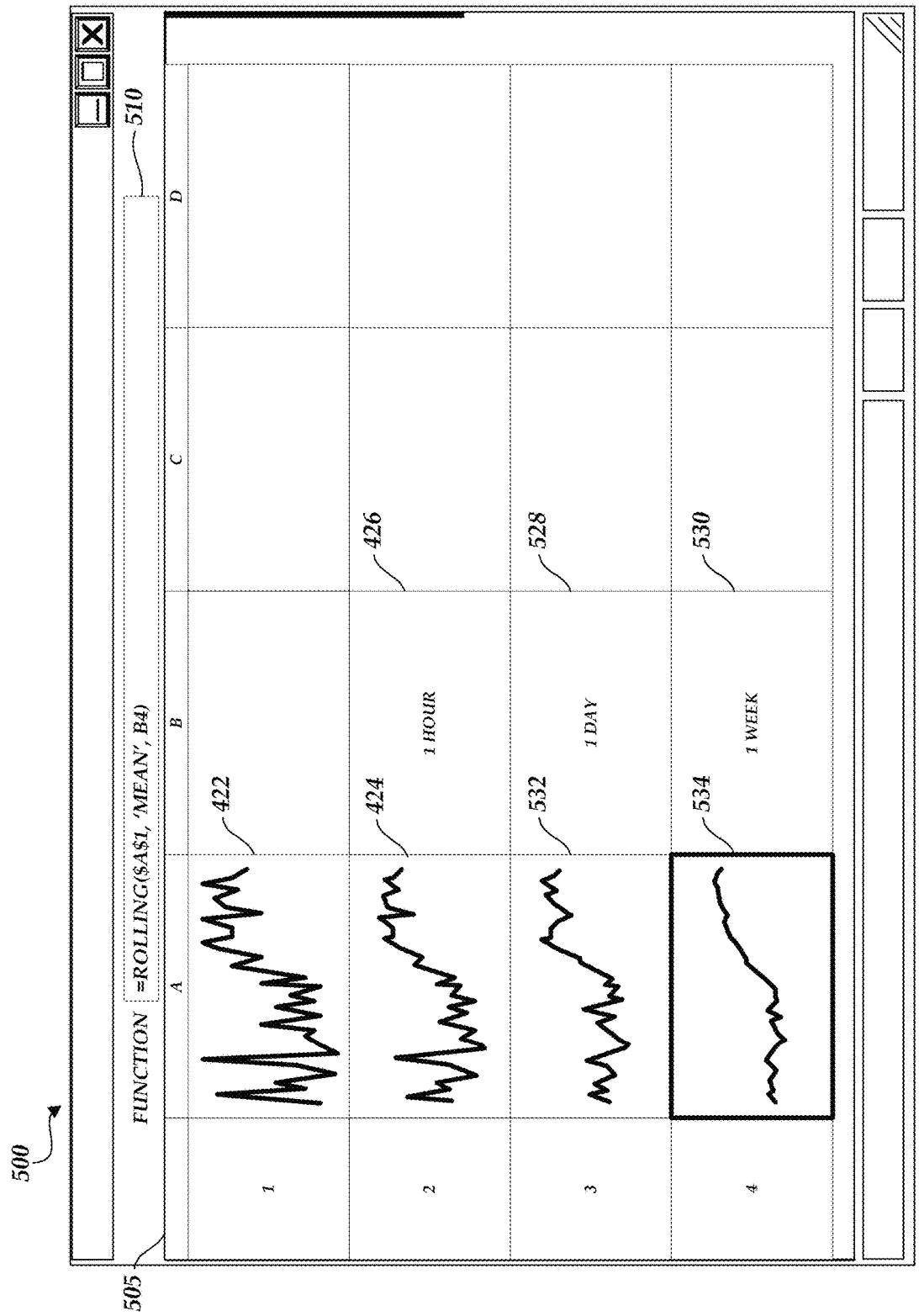

FIGS. 5A-5B illustrate another user interface 500 displaying various cells. The user interface 500 can be displayed by the user device 102 and user interface data that causes the user device 102 to display the user interface 500 can be generated by the spreadsheet application 110 executing on the user device 102 or executing on a network-accessible server.

As illustrated in FIG. 5A, the user interface 500 includes a window 505 that includes various cells. The cells are identified by row (e.g., row 1, row 2, row 3, etc.) and column (e.g., column A, column B, column C, etc.). Unlike the user interface 400, the cell 424 no longer has a function entered that is directed to identifying the maximum value of the data values that form the sparkline displayed in the cell 422. Rather, the cell 424 now has a function entered, as identified in field 510, that is "ROLLING($A$1, 'MEAN', B2)," which is a function directed to calculating and displaying (e.g., as a sparkline) a rolling average of the data values referenced by the cell located at A1 (e.g., the cell 422) over a time period stored in the cell located at B2 (e.g., the cell 426). Specifically, the cell 426 stores the text "1 HOUR." In addition, as described above, the cell 422 references data values of the "NAME1" dataset that fall within a time window defined by a start time (e.g., "0") and an end time (e.g., "10"). Thus, the function identified in the field 510 and entered in the cell 424 is directed to calculating and displaying a 1 hour rolling average of the data values of the "NAME1" dataset that fall within the defined time window.

As described herein, the query generator 112 can generate a corresponding query, the time-series data store 140 can use the query to return corresponding data, and the renderer 114 can generate and display in the cell 424 a sparkline based on the returned data.

In some embodiments, a user may desire to pull the function entered in the cell 424 to other cells, such as cells 532 and 534. For example, the user can enter "1 DAY" in cell 528 and "1 WEEK" in cell 530 in attempt to view a sparkline representing a 1 day rolling average of the data values of the "NAME1" dataset that fall within the defined time window and a sparkline representing a 1 week rolling average of the data values of the "NAME1" dataset that fall within the defined time window in addition to the 1 hour rolling average sparkline displayed in the cell 424. To perform this action, a user can select the cell 424 and then press a key (e.g., the shift key) in combination with another key (e.g., the down arrow key) to highlight the cells to which to pull the function. As noted above, the third parameter of the function entered in the cell 424 does not include a symbol (e.g., "$"), indicating that the value of each character in the third parameter is dependent on the location in which the function is stored. However, the first parameter of the function entered in the cell 424 includes the symbol following each character of the first parameter (e.g., following the "A" and the "1"). Thus, if the function stored in the cell 424 is pulled to the cells 532 and/or 532, the resulting functions entered in the cells 532 and 534 would still reference the cell located at A1. However, the resulting functions would not reference the cell located at B2. Rather, the resulting function entered in the cell 532 would reference the cell located at B3 (e.g., the cell 528) and the resulting function entered in the cell 534 would reference the cell located at B4 (e.g., the cell 530).

As illustrated in FIG. 5B, the user pulled the function entered in the cell 424 to the cells 532 and 534. As a result, modified versions of the cell 424 function are entered in the cells 532 and 534. In addition, the query generator 112 generated a query for the cell 532 using the cell 532 function and a query for the cell 534 using the cell 534 function, resulting in the generation of the sparkline displayed in the cell 532 and the sparkline displayed in the cell 534. The value of the cell 532, however, is the query for the cell 532 (e.g., the data description) and the value of the cell 534 is the query for the cell 534. Thus, the sparkline displayed in the cell 422 represents the data values in the "NAME1" dataset that fall within the defined time window, the sparkline displayed in the cell 424 represents a 1 hour rolling average of the data values used to form the sparkline displayed in the cell 422, the sparkline displayed in the cell 532 represents a 1 day rolling average of the data values used to form the sparkline displayed in the cell 422, and the sparkline displayed in the cell 534 represents a 1 week rolling average of the data values used to form the sparkline displayed in the cell 422.

If a user selects one of the cells, such as the cell 534, the field 510 displays the function entered in the selected cell 534 (e.g., ROLLING(A1, 'MEAN', $B$4)) or the data description stored as the value of the selected cell 534 (not shown). For example, as shown in FIG. 5B, the field 510 displays the modified version of the function entered in the cell 424 based on a pulling or copying of the function into the cell 534 (e.g., the third parameter of the function entered in the cell 534 is "B4" instead of "B2" as included in the cell 424 function).

Example Process Flow

Figure 6:
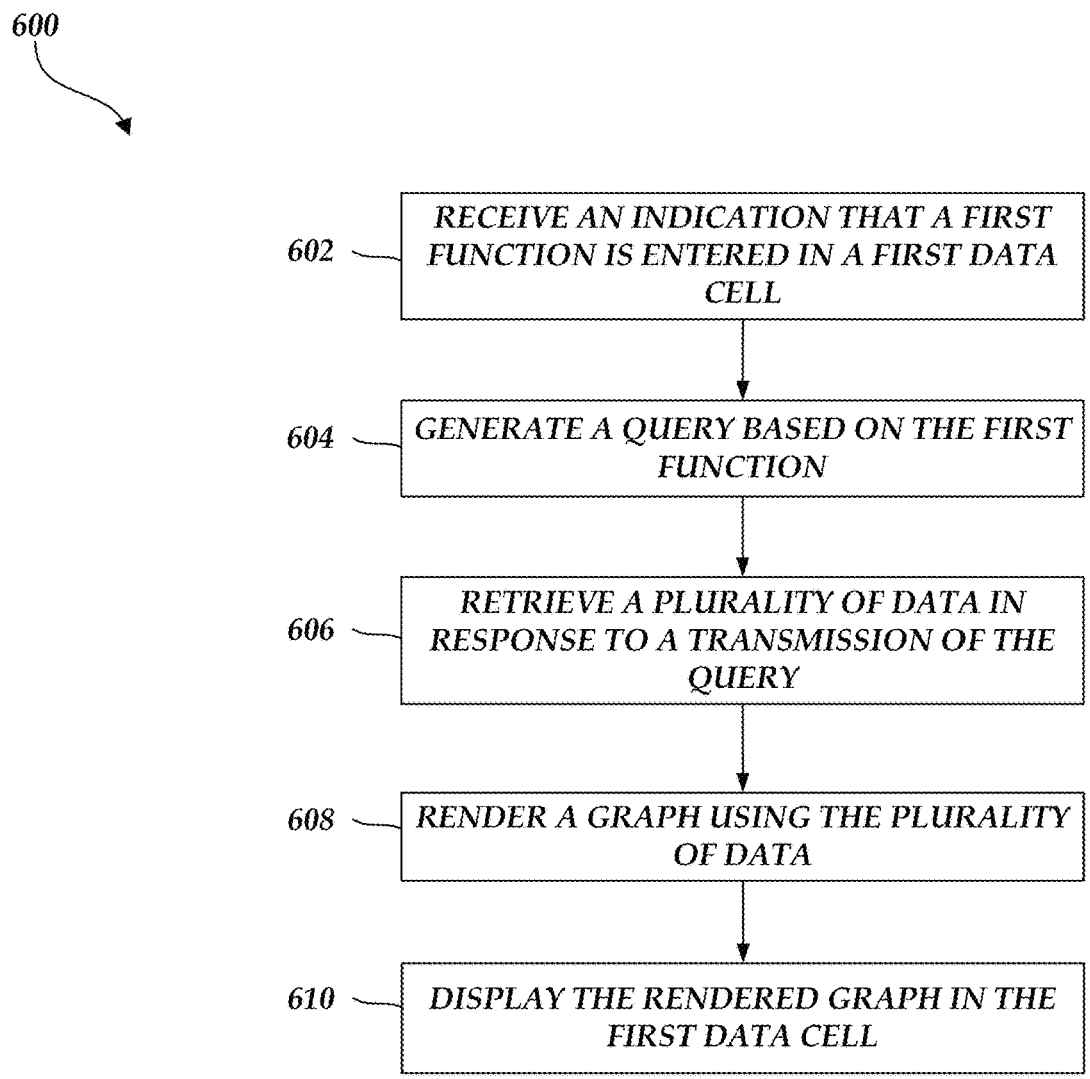
FIG. 6 is a flowchart depicting an illustrative operation of displaying a graph in a cell, according to one embodiment.

FIG. 6 is a flowchart 600 depicting an illustrative operation of displaying a graph in a cell, according to one embodiment. The method of FIG. 6 may be performed by various computing devices, such as by the user device 102 (e.g., the spreadsheet application 110) described above. Depending on the embodiment, the method of FIG. 6 may include fewer and/or additional blocks and the blocks may be performed in an order different than illustrated.

In block 602, an indication that a first function is entered in a first data cell is received. For example, the first function can be a function that references a particular dataset.

In block 604, a query based on the first function is generated. For example, the query can reference the dataset referenced by the first function, an indication of a portion of the dataset to retrieve, any mathematical operations to perform on the dataset, a number of available cell pixels, and/or a time duration of a single pixel.

In block 606, a plurality of data is retrieved in response to a transmission of the query. For example, the plurality of data can be retrieved from the time-series data store 140.

In block 608, a graph is rendered using the plurality of data. For example, the graph can be a line graph, bar graph, pie graph, sparkline, X-Y scatterplot, a chart, another data visualization, etc.

In block 610, the rendered graph is displayed in the first data cell. However, the rendered graph is not the stored value in the first data cell. Rather, a data description (e.g., the generated query) is the value stored in the first data cell. The rendered graph is merely a visual representation of the data and/or operations referenced by the data description stored in the first data cell.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
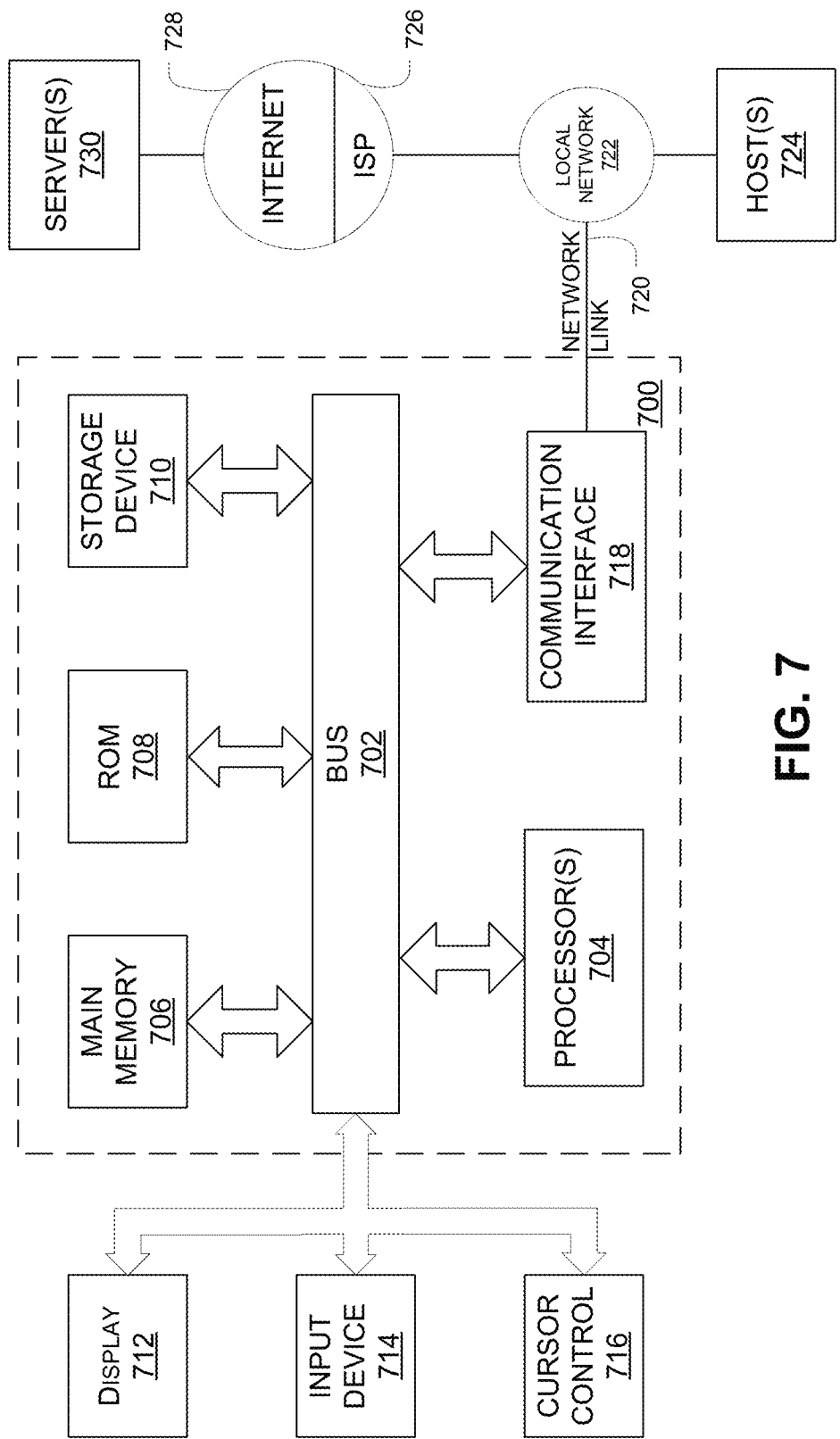
FIG. 7 illustrates a computer system with which certain methods discussed herein may be implemented, according to one embodiment.

For example, FIG. 7 is a block diagram that illustrates a computer system 700 upon which an embodiment may be implemented. For example, any of the computing devices discussed herein may include some or all of the components and/or functionality of the computer system 700.

Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. Main memory 706 may also store cached data, such as zoom levels and maximum and minimum sensor values at each zoom level.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions. For example, the storage device 710 may store measurement data obtained from a plurality of sensors.

Computer system 700 may be coupled via bus 702 to a display 712, such as a cathode ray tube (CRT) or LCD display (or touch screen), for displaying information to a computer user. For example, the display 712 can be used to display any of the user interfaces described herein with respect to FIGS. 4A through 5B. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieve and execute the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry. The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating or otherwise vexing to user.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system comprising:
   a renderer;
   at least one processor; and
   a storage device configured to store computer-executable instructions, the computer-executable instructions, when executed by the at least one processor, cause the system to at least:
   generate user interface data that, when rendered by a user device, causes the user device to display a user interface, wherein the user interface depicts a first data cell;
   receive an indication that a first function is entered in the first data cell;
   generate a first query using the first function in response to receiving the indication that the first function is entered in the first data cell;
   retrieve a plurality of data using the first query;
   render a data visualization using the plurality of data; and
   update the user interface data such that the user interface displays the rendered data visualization in the first data cell, while storing the first query as a value of the first data cell.

2. The system of claim 1, wherein the computer-executable instructions are associated with a first application, wherein the storage device is further configured with second computer-executable instructions associated with a second application, the second computer-executable instructions, when executed by the at least one processor, cause the system to at least:
   obtain the first query from the first application;
   render a second data visualization using the first query; and
   generate second user interface data that, when rendered by the user device, causes the user device to display a second user interface, wherein the second user interface includes the rendered second data visualization.

3. The system of claim 2, wherein the computer-executable instructions, when executed by the at least one processor, further cause the system to at least:
obtain an indication from the second application that the rendered second data visualization is modified;
generate a modified version of the first query using the first function and the obtained indication;
retrieve a modified plurality of data using the modified version of the first query;
rendered a modified data visualization using the modified plurality of data; and
update the user interface data such that the user interface displays the rendered modified data visualization in the first data cell.

4. The system of claim 1, wherein the computer-executable instructions, when executed by the at least one processor, further cause the system to at least:
receive an indication that a second function is entered in a second data cell, wherein the second function references the first function;
generate a second query using the first function and the second function;
retrieve a second plurality of data using the second query;
render a second data visualization using the second plurality of data; and
update the user interface data such that the user interface displays the rendered second data visualization in the second data cell.

5. The system of claim 4, wherein the second function references a conditional formatting display operation, and wherein the computer-executable instructions, when executed by the at least one processor, further cause the system to at least render the second data visualization according to the conditional formatting display operation in response to a determination that a condition associated with the conditional formatting display operation occurred.

6. The system of claim 4, wherein the computer-executable instructions, when executed by the at least one processor, further cause the system to at least:
receive an indication that a third function is entered in a third data cell, wherein the third function references the first function, the second function, and a first condition;
generate a third query using the first function, the second function, and the third function;
retrieve a first value using the third query; and
generate a notification in response to a determination that the first value satisfies the first condition.

7. The system of claim 1, wherein the computer-executable instructions, when executed by the at least one processor, further cause the system to at least:
cache the rendered data visualization; and
retrieve the rendered data visualization from cache in response to reception of a re-paint operation.

8. The system of claim 1, wherein a first timestamp is stored in a second data cell, wherein the first function references the second data cell, and wherein the computer-executable instructions, when executed by the at least one processor, further cause the system to at least:
generate the query using the first function and the first timestamp;
receive an indication that the second data cell is updated to store a second timestamp;
generate a second query using the first function and the second timestamp;
retrieve a second plurality of data using the second query;
render a second data visualization using the second plurality of data; and
update the user interface data such that the user interface displays the rendered second data visualization in the first data cell, while storing the second query as the value of the first data cell.

9. The system of claim 1, wherein the first query identifies a number of available cell pixels, and wherein the plurality of data comprises, for each available cell pixel, a minimum value and a maximum value, and wherein the computer-executable instructions, when executed by the at least one processor, further cause the system to at least render the data visualization by, for each available cell pixel, drawing a line from the respective minimum value to the respective maximum value.

10. The system of claim 1, wherein the computer-executable instructions, when executed by the at least one processor, further cause the system to at least:
receive an indication that the first function is pulled to a second data cell, wherein the first function includes a parameter dependent on the location in which the first function is entered; and
enter a second function in the second data cell, wherein the second function comprises the first function with the parameter modified to reflect the location in which the second function is entered.

11. The system of claim 1, wherein the computer-executable instructions, when executed by the at least one processor, further cause the system to at least:
receive an indication that the first data cell is resized;
generate a modified query using the first function and a representation of a size of the resized first data cell;
retrieve a second plurality of data using the modified query;
render a second data visualization using the second plurality of data; and
update the user interface data such that the user interface displays the rendered second data visualization in the first data cell.

12. The system of claim 11, wherein the representation of the size of the resized first data cell comprises at least one of a number of available cell pixels in the resized first data cell or a time duration of a single pixel in the resized first data cell.

13. The system of claim 1, wherein the computer-executable instructions, when executed by the at least one processor, further cause the system to at least:
receive an indication that the first data cell is selected;
update the user interface data such that the user interface displays a window of a first size;
generate a modified query using the first function and a representation of a size of the window;
retrieve a second plurality of data using the modified query;
render a second data visualization using the second plurality of data; and
update the user interface data such that the user interface displays the rendered second data visualization in the window.

14. The system of claim 1, wherein the first function comprises a display operation, and wherein the computer-executable instructions, when executed by the at least one processor, further cause the system to at least render the data visualization using the plurality of data and the display operation.

15. The system of claim 1, wherein the rendered data visualization comprises one of a line graph, a bar graph, a pie graph, a sparkline, an X-Y scatterplot, or a chart.

16. A computer-implemented method comprising:
generating user interface data that, when rendered by a computing device, causes the computing device to display a user interface, wherein the user interface depicts a first data cell;
receiving an indication that a first function is entered in the first data cell;
generating a first query using the first function in response to receiving the indication that the first function is entered in the first data cell;
retrieving a portion of a dataset using the first query;
rendering a data visualization using the retrieved portion of the dataset; and
updating the user interface data such that the user interface displays the rendered data visualization in the first data cell, while storing the first query as a value of the first data cell,
wherein the method is performed using one or more processors.

17. One or more non-transitory, computer-readable storage media storing computer-executable instructions, which if performed by one or more processors, cause the one or more processors to at least:
generate user interface data that, when executed, causes a display of a user interface, wherein the user interface depicts a first data cell;
receive an indication that a first function is entered in the first data cell;
generate a first query using the first function in response to reception of the indication that the first function is entered in the first data cell;
retrieve a portion of a dataset using the first query;
render a data visualization using the retrieved portion of the dataset; and
update the user interface data such that the user interface displays the rendered data visualization in the first data cell, wherein the first query is stored in the first data cell.

* * * * *